United States Patent [19]
Young et al.

[11] Patent Number: 4,873,469
[45] Date of Patent: Oct. 10, 1989

[54] INFRARED ACTUATED CONTROL SWITCH ASSEMBLY

[75] Inventors: William A. Young, Aurora, Colo.; Wai-Shing Ko, Aurora, Ill.; Curtis R. Davidson, Oswego, Ill.; Thomas Whitehurst, Bensenville, Ill.

[73] Assignee: Pittway Corporation, Northbrook, Ill.

[21] Appl. No.: 107,002

[22] Filed: Oct. 14, 1987

Related U.S. Application Data

[63] Continuation-in-part of Ser. No. 52,763, May 21, 1987, Pat. No. 4,823,051.

[51] Int. Cl.$^4$ .......................... G01J 5/08; G08B 13/18
[52] U.S. Cl. ..................................... 315/155; 250/221; 250/353; 250/342; 315/158; 315/159; 340/567
[58] Field of Search ............. 250/214, 342, 353, 221; 315/159, 362, 158, 155; 340/565, 566, 567

[56] References Cited

U.S. PATENT DOCUMENTS

| | | | |
|---|---|---|---|
| 3,864,566 | 2/1975 | Simpson et al. | 250/342 X |
| 3,886,360 | 5/1975 | Reiss et al. | 250/338 |
| 3,958,118 | 5/1976 | Schwarz | 340/567 X |
| 3,988,726 | 10/1976 | Reiss et al. | 250/338 X |
| 4,081,680 | 3/1978 | Keller | 250/342 |
| 4,225,786 | 9/1980 | Perlman | 250/342 |
| 4,245,217 | 1/1981 | Steinhage | 340/555 |
| 4,258,255 | 3/1981 | Guscott | 250/342 |
| 4,263,585 | 4/1981 | Schaefer | 340/567 |
| 4,268,752 | 5/1981 | Herwig et al. | 250/342 X |
| 4,271,359 | 6/1981 | Herwig et al. | 250/342 X |
| 4,271,360 | 6/1981 | Ward | 250/353 |
| 4,275,303 | 6/1981 | Mudge | 250/342 |
| 4,339,748 | 7/1982 | Guscott et al. | 340/567 X |
| 4,342,987 | 8/1982 | Rossin | 340/567 |
| 4,447,726 | 5/1984 | Mudge et al. | 250/342 |
| 4,479,056 | 10/1984 | Zierhut | 250/342 |
| 4,510,488 | 4/1985 | St. Jean et al. | 340/567 |
| 4,514,630 | 4/1985 | Takahashi | 250/342 |
| 4,514,631 | 4/1985 | Guscott | 250/342 |
| 4,551,711 | 11/1985 | Akiyama et al. | 250/342 X |
| 4,625,115 | 11/1986 | Guscott | 250/342 X |
| 4,672,206 | 6/1987 | Suzuki et al. | 250/342 |
| 4,689,486 | 8/1987 | Lederer | 250/342 X |
| 4,707,604 | 11/1987 | Guscott | 340/567 X |
| 4,768,020 | 8/1988 | Chen | 340/567 |

Primary Examiner—James J. Groody
Assistant Examiner—Mark R. Powell
Attorney, Agent, or Firm—Dressler, Goldsmith, Shore, Sutker & Milnamow, Ltd.

[57] ABSTRACT

A switch assembly actuated by passive infrared radiation for operating a light in a space, the switch assembly including an optical system which senses infrared radiation over a 180° range in horizontal plane including two separate vertical fields of view, a generally horizontal "look-out" field and a vertical semi cone-shaped "look-down" sensing field for directing to a common sensing element passive infrared radiation produced by a person moving within the sensing field of the switch assembly, the sensing element connected to a control circuit which responsively turns on the light, maintains the light on while the person remains in the space, and turns the light off automatically when the person leaves the space. The switch assembly includes a one-piece optical shell enclosed within a housing which is adapted for installation in a conventional light switch box in room. Another embodiment of the switch assembly is adapted for mounting on the exterior wall of a building for controlling the energization of an exterior light, turning the light on automatically whenever a person approaches the building.

32 Claims, 19 Drawing Sheets

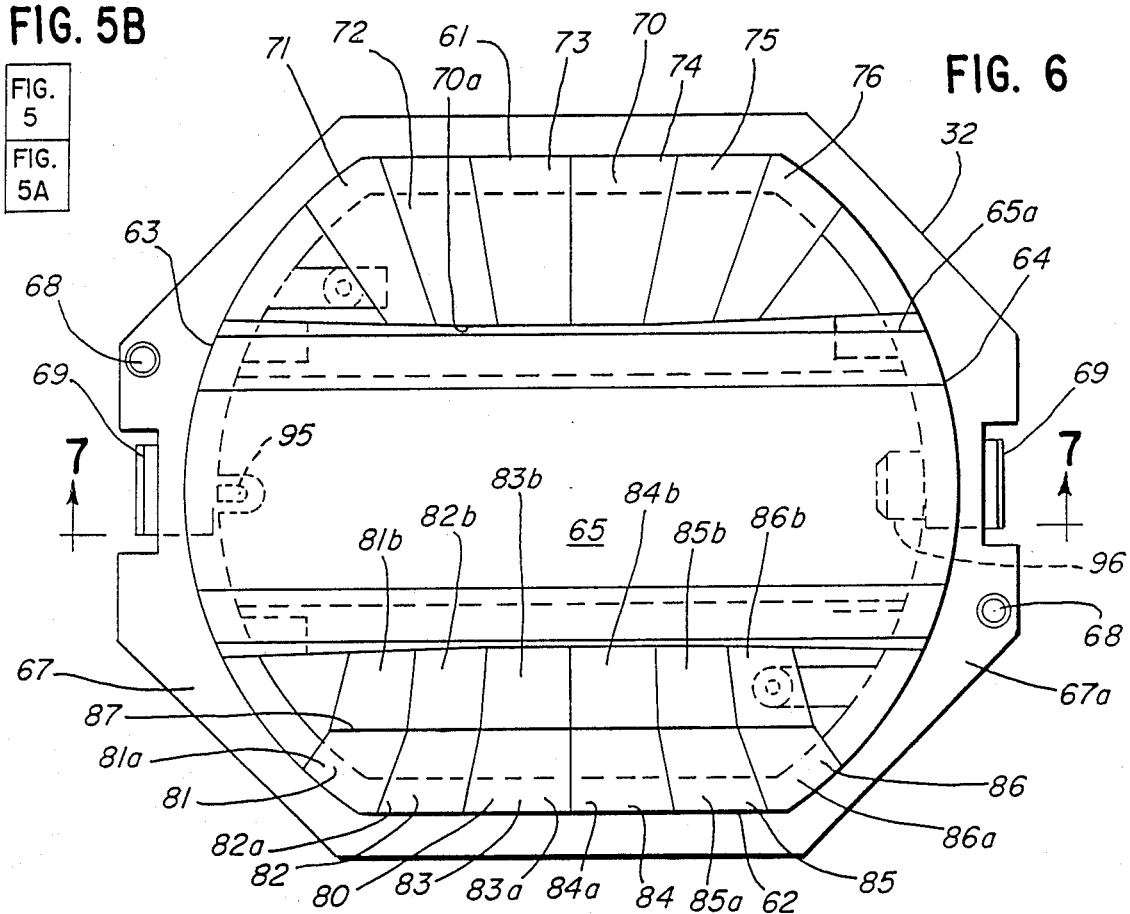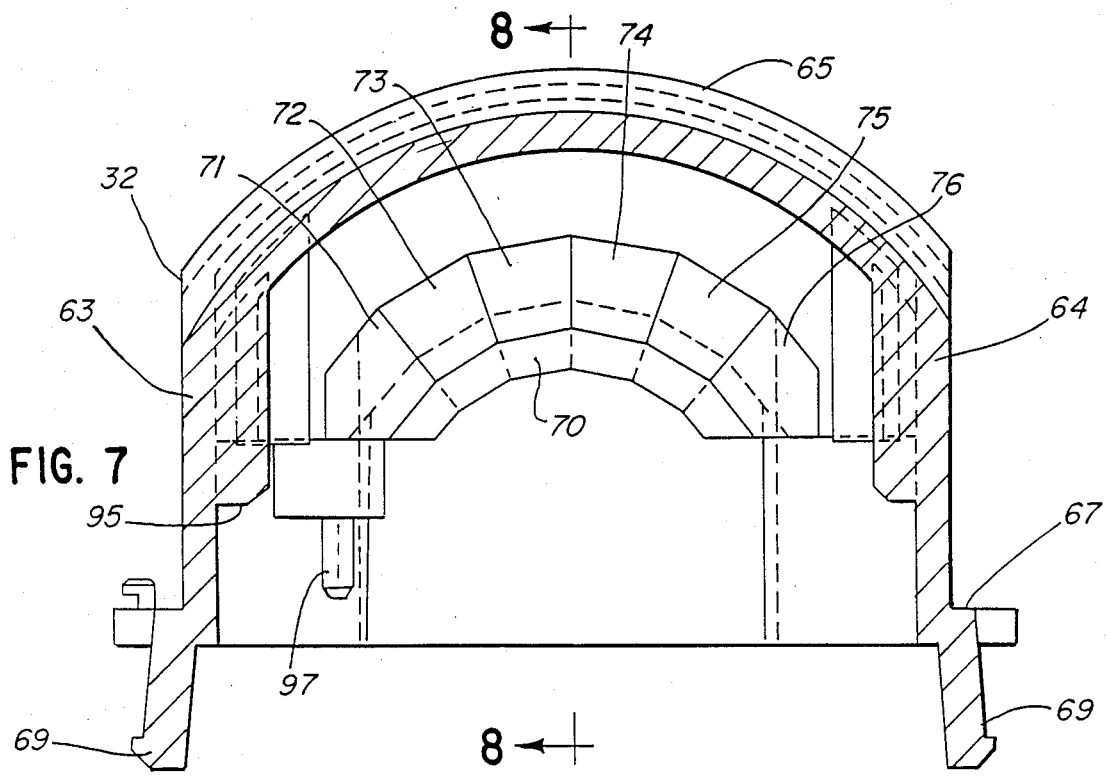

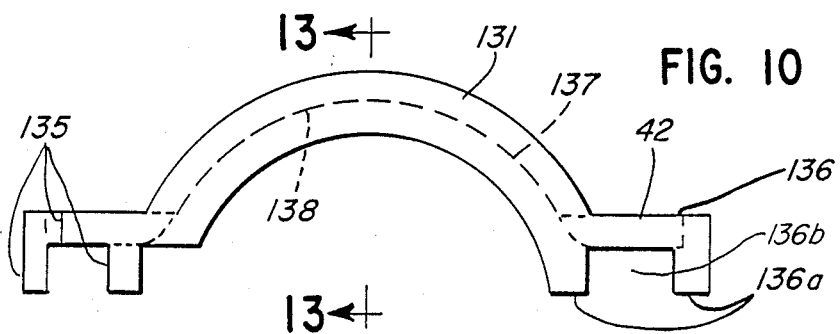
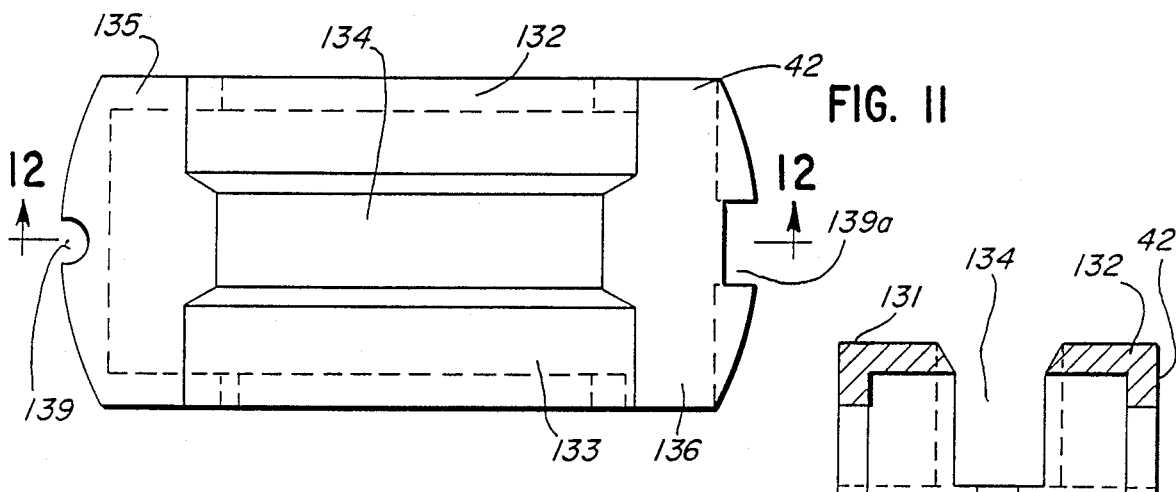
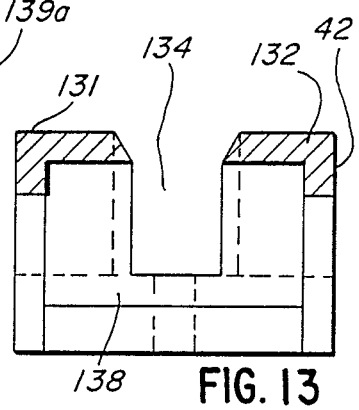
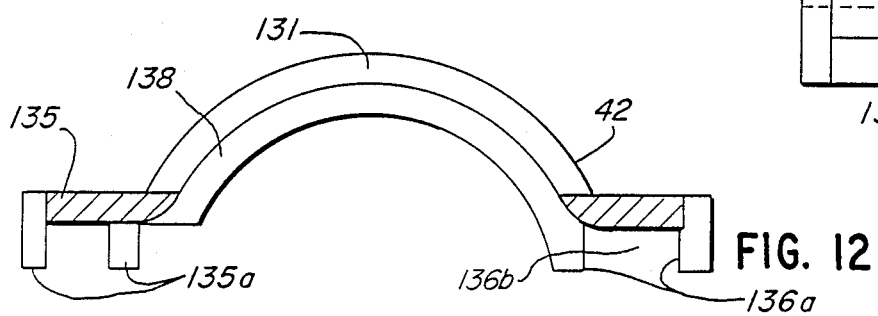
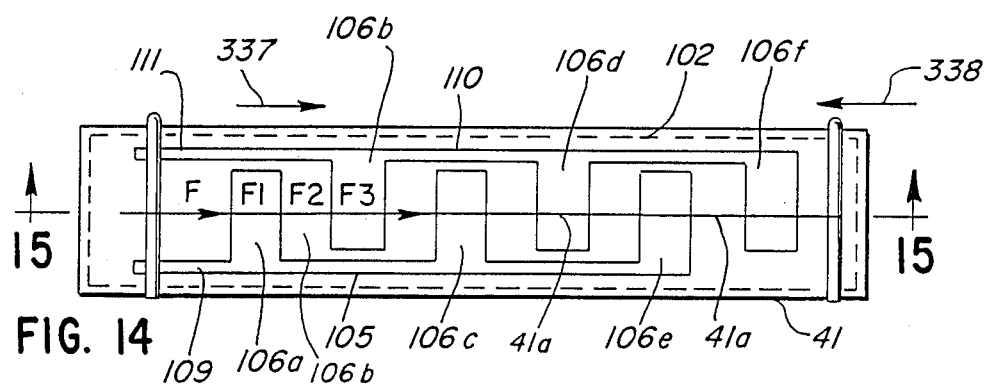
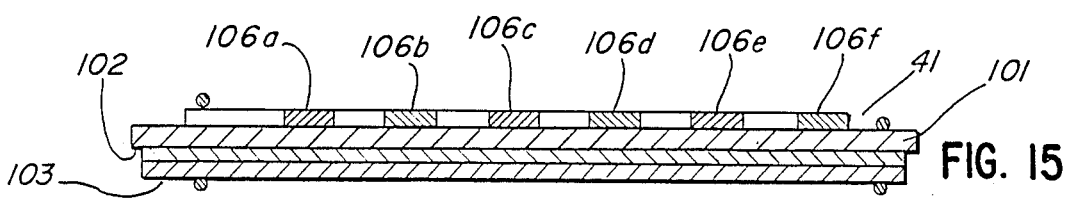

FIG. 19
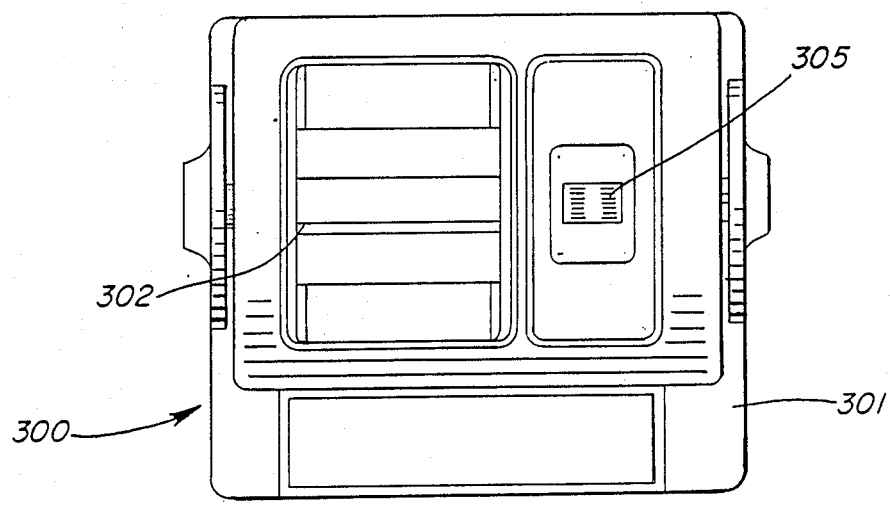
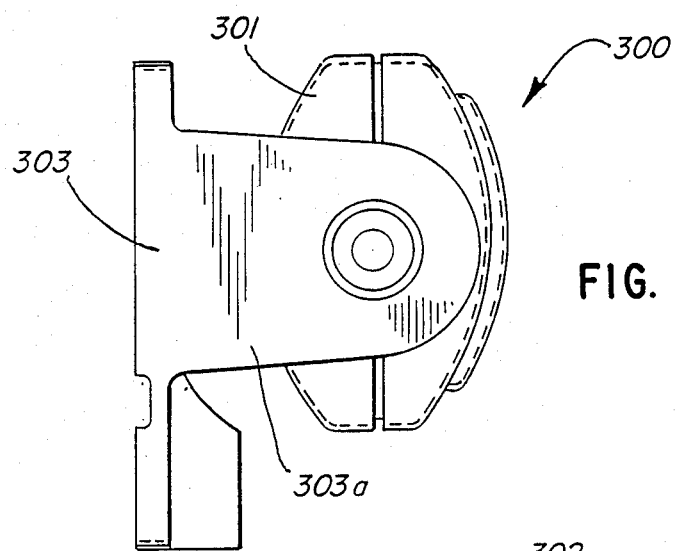
FIG. 20
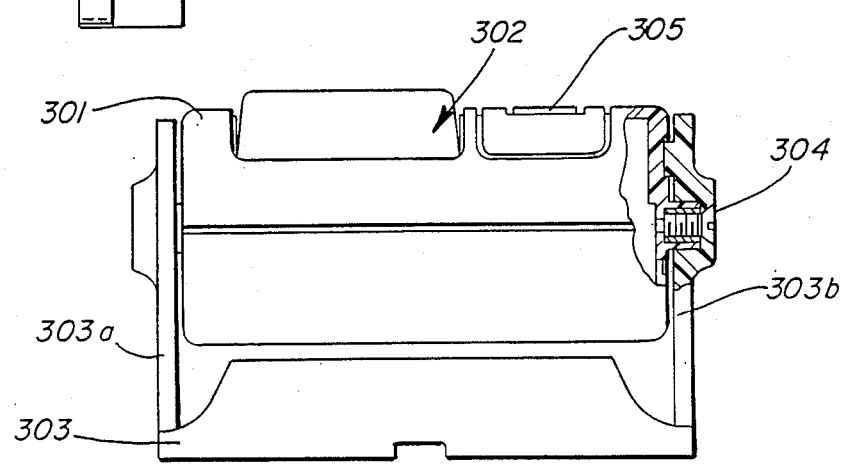
FIG. 21

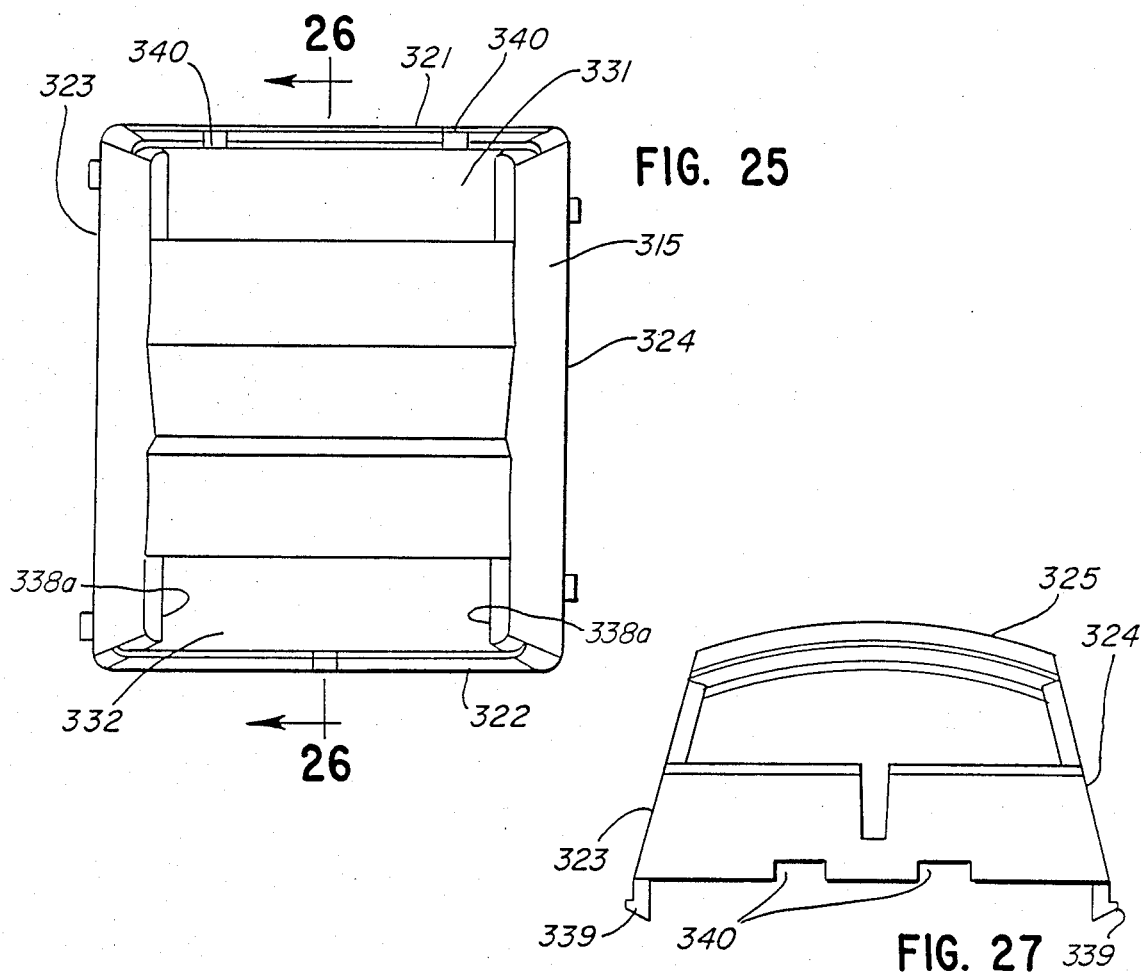
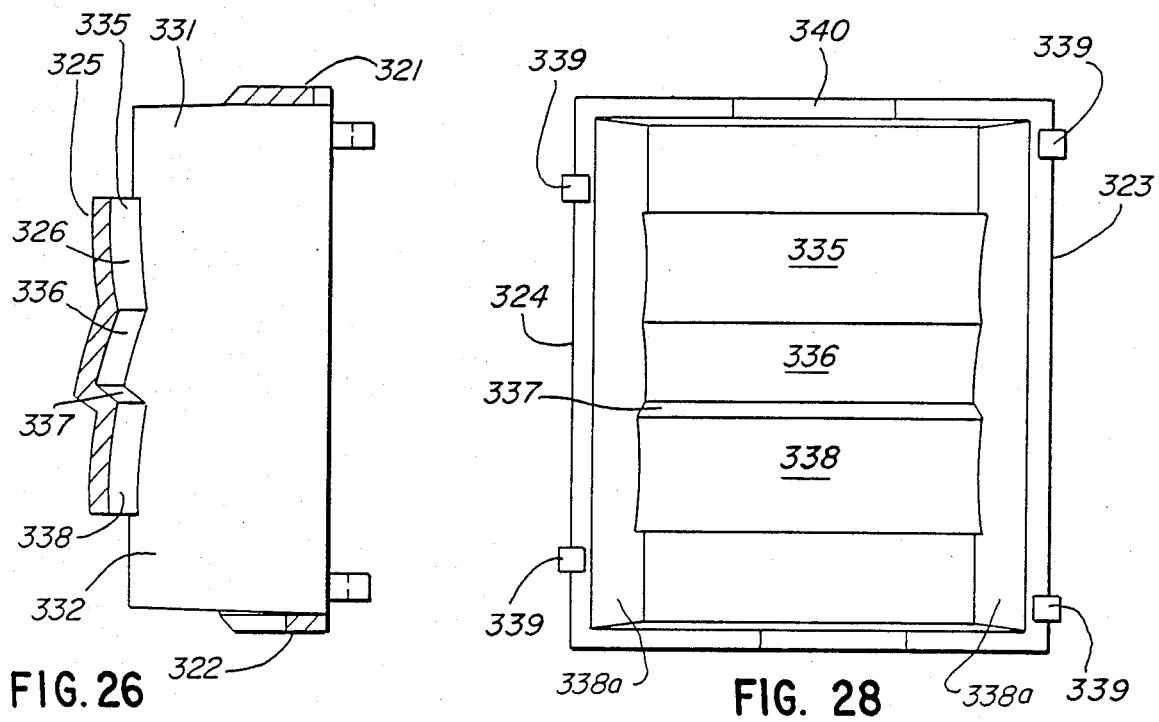

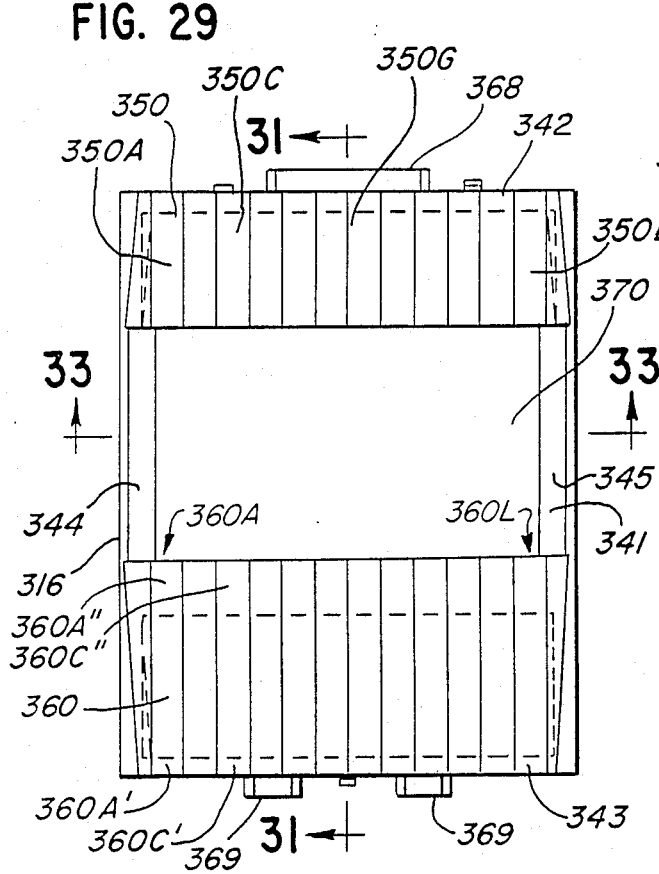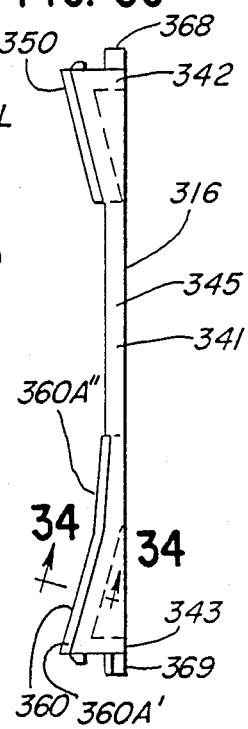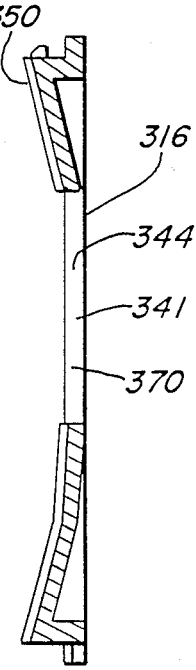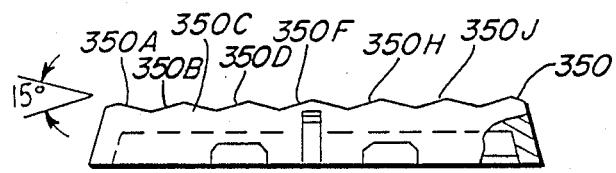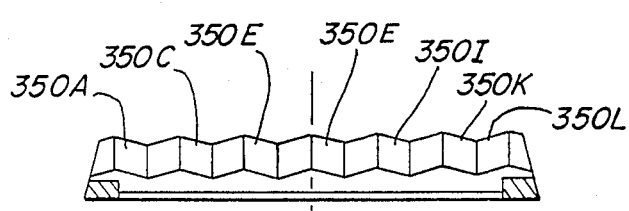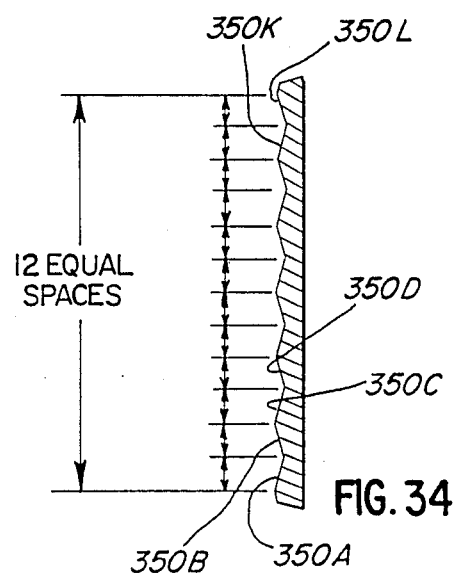

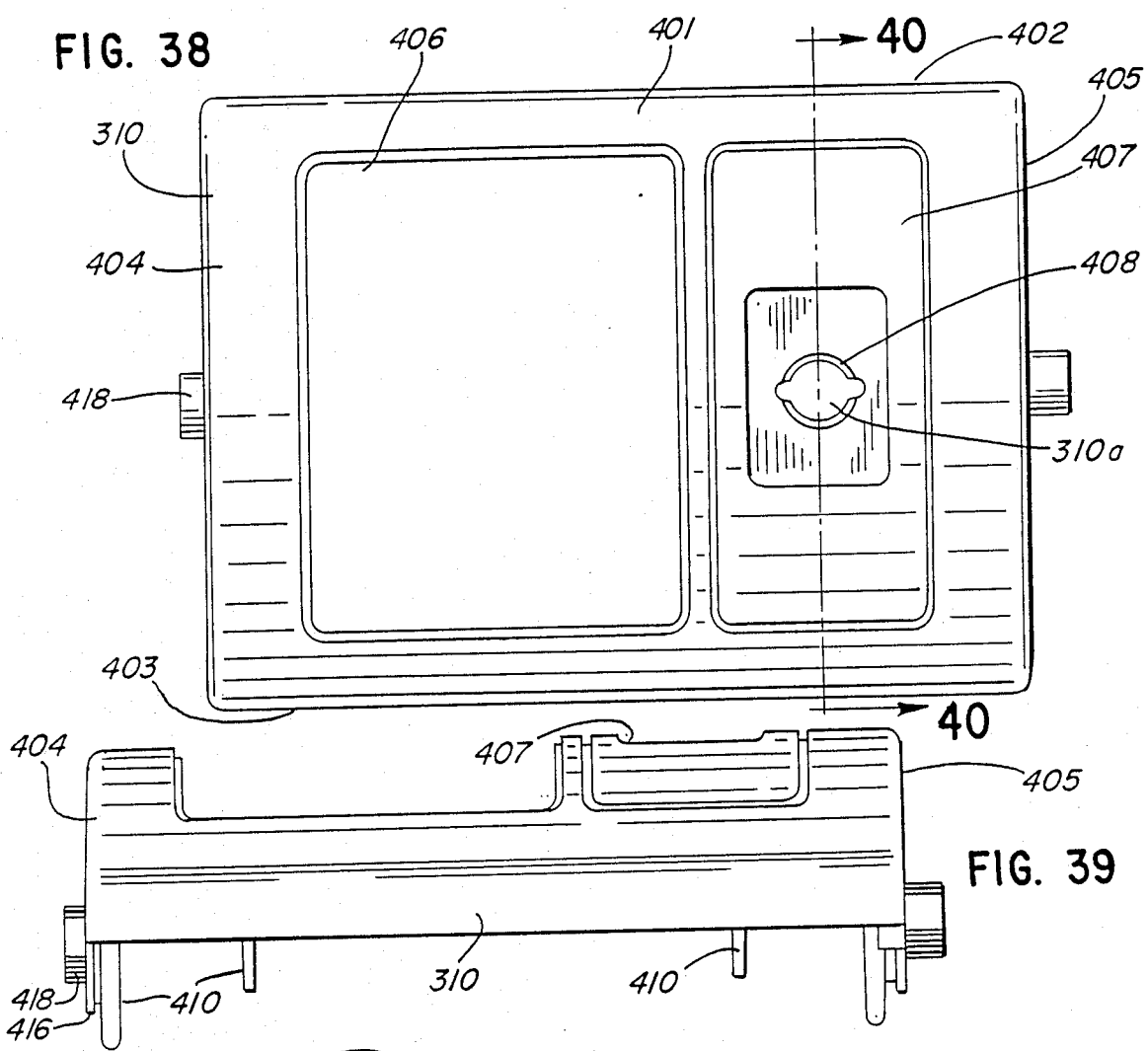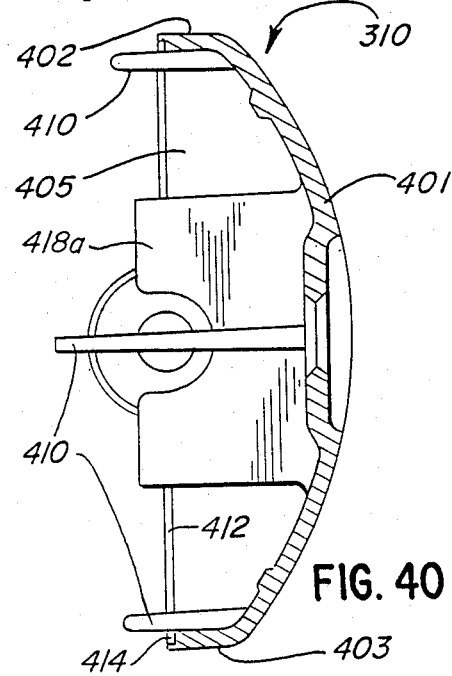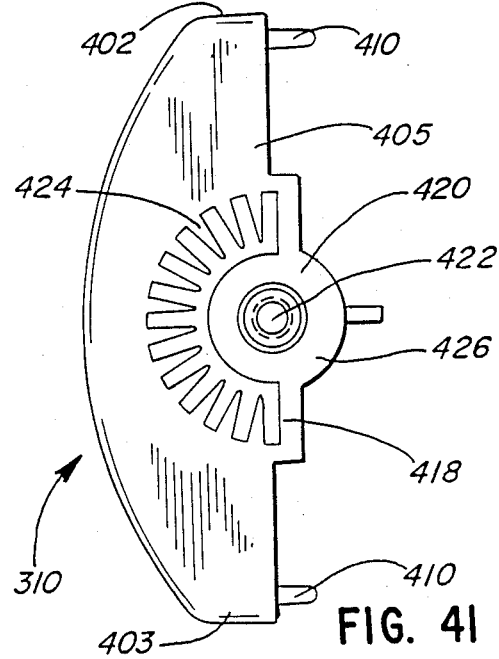

4,873,469

INFRARED ACTUATED CONTROL SWITCH ASSEMBLY

This is a continuation-in-part of application Ser. No. 52,763, filed May 21, 1987, entitled INFRARED ACTUATED CONTROL SWITCH ASSEMBLY, now U.S. Pat. No. 4,823,051.

BACKGROUND OF THE INVENTION

This invention relates to passive infrared radiation actuated motion detection apparatus, and more particularly to a passive infrared actuated control switch assembly for controlling the operation of a functional device in response to detection of movement of a source of infrared radiation within an area monitored by the switch assembly.

Presently, the operation of electric lights is controlled by manually operated switches. Wall switches are provided for controlling the energization and deenergization of ceiling mounted lamps or lamps plugged into electrical receptacles wired to the wall switch. A person entering a darkened room must search for the wall switch to turn on the room light. In the instance where the person is carrying articles and does not have a free hand for searching for the wall switch, the person must enter the room and set down the articles before groping for the light switch. Similarly, when a person is about to leave a room carrying a number of items, the person must either turn off the light before picking up the items before leaving the room, or must leave the room light on.

It is common practice for persons leaving the room to leave the light on even though the person may not intend to return to the room. Thus, the room lights are maintained on even when they are not needed. This practice results in waste of energy.

Thus, it would be desirable to have an arrangement for controlling the energization of a room light automatically and instantly in response to a person entering a room and which provides for deenergization of the light when the person exits the room.

Likewise, it would be desireable to have an arrangement for controlling the energization of a porch light or yard light for a house or dwelling, for example, affording both convenience and safety for automatically turning the light on whenever someone approaches the house. This would both illuminate the approach to the house for the convenience and safety of the person approaching the house and alert occupants of the house to the fact that someone is approaching the house. In addition, this would save energy because the light would be turned on only when needed and would be turned off a short time after everyone has left the area illuminated by the light.

SUMMARY OF THE INVENTION

Accordingly, it is an object of the present invention to provide an improved control switch assembly which responds to variations in passive infrared radiation produced as the result of a movement of a source of infrared radiation within a given space and controls the operation of a functional device.

It is another object of the present invention to provide a control switch assembly which responds to passive infrared radiation indicative of movement of a source of infrared radiation within a given space to energize a light within the space for illuminating the space.

A further object of the present invention is to provide a control switch assembly which detects passive infrared radiation within a space, both in a 180° generally horizontal look-out field extending generally forwardly the switch assembly and in a 180° a shallow look-down field extending downwardly and outwardly from the switch assembly, and responds to variation in the infrared radiation detected, indicative of movement of a source of infrared radiation within a field of view of the switch assembly, to illuminate the space.

Yet another object of the present invention is to provide a control switch assembly which detects passive infrared radiation within a space in two separate 180° vertical fields of view including a shallow look-out field and a more vertical look-down field.

Another object of the present invention is to provide an infrared radiation actuated control switch assembly for controlling the energization of a light bulb wherein the switch assembly is adapted for mounting in a conventional electrical wall switch receptacle for connecting electrical power to a light bulb that it controls for illuminating a room or other area of a house or building.

Yet another object of the present invention is to provide an infrared actuated control switch assembly which is adapted for mounting on the exterior of a building for controlling the energization of an exterior light of the building in response to movement of a person within a sensing field for the switch assembly.

The present invention provides an infrared radiation actuated control switch assembly responsive to infrared radiation within a given space for controlling a functional device in response to detection of variations in infrared radiation, indicative of movement of a source of infrared radiation within the space.

The control switch assembly comprises sensing means including a sensing element responsive to infrared radiation; optical means; control circuit means; and housing means for containing said sensing means, said optical means and said control circuit means; said housing means constructed and arranged for mounting within the space; said optical means supported within said housing means and including first reflecting means, second reflecting means and focusing means, said sensing element being mounted in an operative relation with said focusing means, said first and second reflecting means each including planar reflecting means for reflecting to said focusing means infrared radiation in a first sensing field extending over a 180° range and at a first predetermined semivertical angle within the space, said second reflecting means including further planar reflecting means for reflecting to said focusing means infrared radiation in a second sensing field extending over a 180° range and at a second predetermined semivertical angle within the space, and said focusing means focusing onto said sensing element, infrared radiation from said first and second sensing fields reflected by said first and second reflecting means, said circuit means connected to said sensing element and responsive to said sensing element for providing an output for energizing the functional device in response to variation in infrared radiation focused onto said sensing element, indicative of movement of source of infrared radiation within the space.

The invention consists of certain novel features and structural details hereinafter fully described, illustrated in the accompanying drawings, and particularly pointed in the appended claims, it being understood that various changes in the details may be made without departing from the spirit, or sacrificing any of the advantages of the present invention.

DESCRIPTION OF THE DRAWINGS

For the purpose of facilitating and understanding the invention, there is illustrated in the accompanying drawings a preferred embodiment thereof, from an inspection of which, when considered in connection with the following description, the invention, its construction and operation, and many of its advantages will be readily understood and appreciated.

FIG. 5B illustrates the manner in which FIGS. 5 and 5A are to be assembled together;

FIG. 6 is a bottom plan view of the optics shell for the switch assembly;

FIG. 7 is a vertical section view taken along the line 7—7 of FIG. 6;

FIG. 10 is a side elevational view of the sensor holder for the switch assembly;

FIG. 11 is a top plan view of the sensor holder;

FIG. 12 is a vertical sectional view taken along line 12—12 of FIG. 11;

FIG. 13 is a vertical section view taken along the line 13—13 of FIG. 10;

FIG. 14 is a plan view of the sensor of the switch unit

FIG. 15 is a sectional view taken along the line 15—15 of FIG. 14;

FIG. 19 is a front plan view of a control switch assembly provided in accordance with a further embodiment of the invention;

FIG. 20 is a side elevational view of the switch assembly shown in FIG. 19;

FIG. 21 is a top plan view of the switch assembly shown in FIG. 19;

FIG. 25 is a front elevational view of the optics shell for the switch assembly shown in FIG. 19;

FIG. 26 is a vertical sectional view taken along the line 26—26 of FIG. 25;

FIG. 27 is a top plan view of the optics shell shown in FIG. 25;

FIG. 28 is a rear elevational view of the optics shell;

FIG. 29 is a front elevational view of an optics back plate for the optics shell shown in FIG. 25;

FIG. 30 is a side elevational view of the back plate;

FIG. 31 is a vertical sectional view taken along the line 31—31 of FIG. 29;

FIG. 32 is a bottom plan view of the optics back plate;

FIG. 33 is a horizontal sectional view taken along the line 33—33 of FIG. 29;

FIG. 34 is a sectional view taken along the line 34—34 of FIG. 30;

FIG. 38 is a front elevational view of a housing front for the switch assembly shown in FIG. 19;

FIG. 39 is a bottom plan view of the housing front;

FIG. 40 is a vertical sectional view taken along the line 40—40 of FIG. 38;

FIG. 41 is an end elevational view of the housing front;

DESCRIPTION OF PREFERRED EMBODIMENTS

Figure 1:
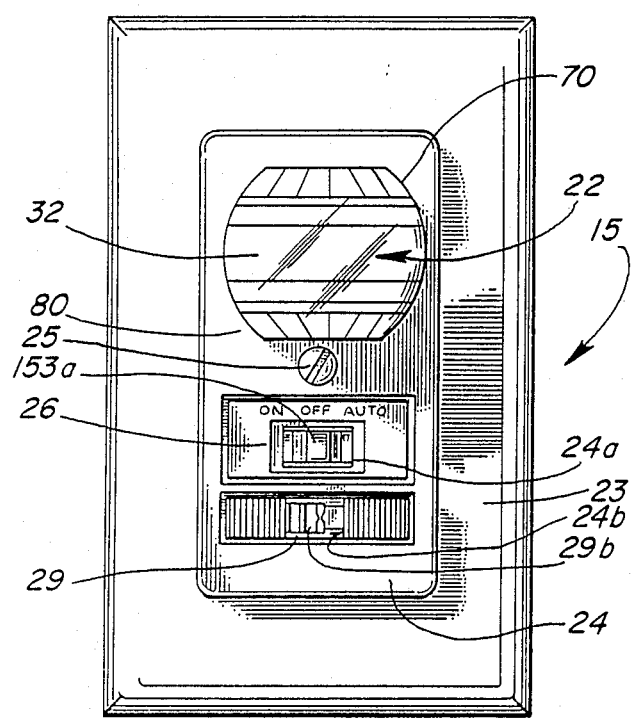
FIG. 1 is a front plan view of a control switch assembly provided by the present invention.
Figure 2:
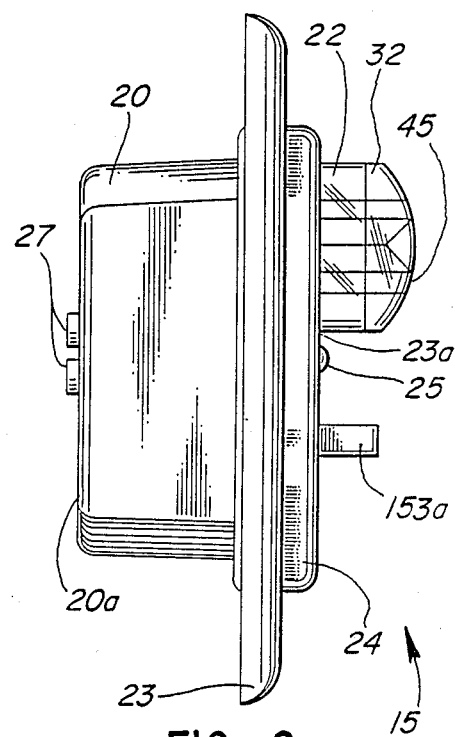
FIG. 2 is a side elevation view of the switch assembly.
Figure 3:
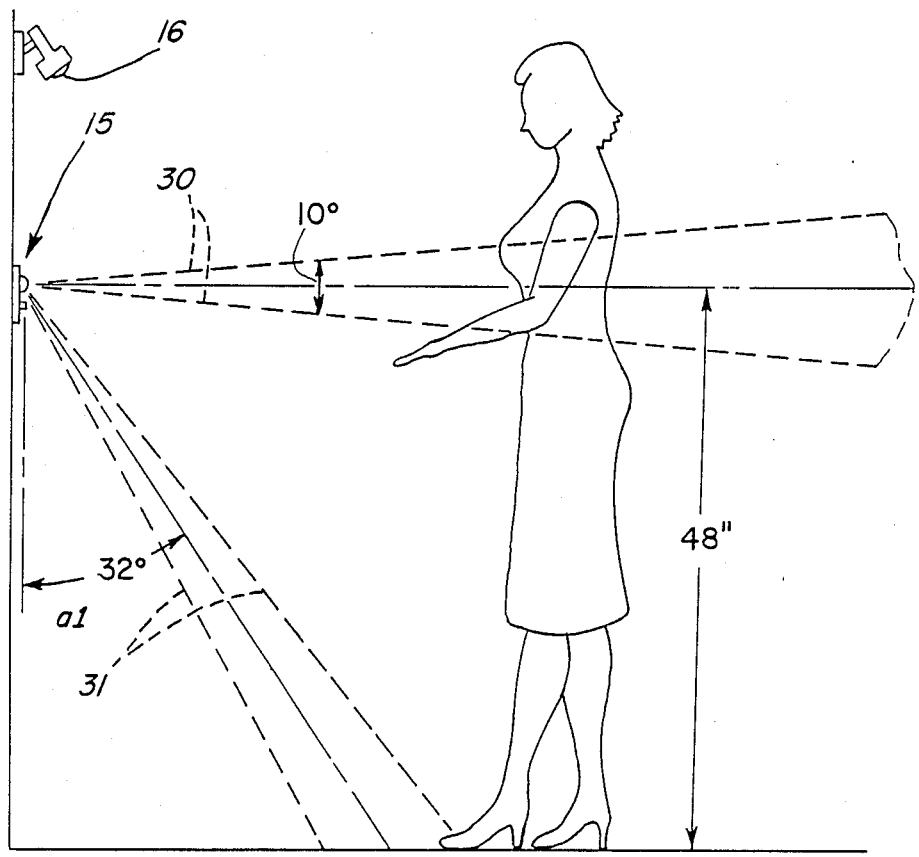
FIG. 3 illustrates the switch assembly mounted in a wall of a room and illustrating the look-out field and the look-down field for the switch assembly.

Referring to FIGS. 1-3, the passive infrared actuated switch assembly 15 incorporating the features of the present invention is described as being used to control the energization and deenergization of a light bulb 16 in a room.

The passive infrared actuated switch assembly 15 includes a housing 20, a sensor module 22 mounted in the housing and a cover assembly including a conventional duplex wall plate 23 and a front cover bezel 24 secured to the sensor module by a screw 25. The housing is provided at its rearward surface 20a with a connector 27 which is adapted to receive power and ground wire of the conventional electrical wiring system for energizing the switch assembly 15.

The switch assembly is provided with a mode switch 26 which enables the switch assembly to be operated in manual mode in which the light bulb 16 is turned on or off by operating the switch 26 to the ON position or the OFF position, respectively. In the automatic mode, selected by operating the switch 26 to the AUTO position, the light bulb is turned on and off automatically under the control of the switch assembly. The light bulb is turned on when a source of infrared radiation moves within the detection fields of the switch assembly. The light bulb is turned off after a preselected time delay after movement of the infrared radiation is no longer sensed. The switch assembly includes a photocell 28 (FIG. 5A) and associated light lens assembly 29, including a light pipe 29a and a lens cover 29b, which enables the switch assembly to be inhibited whenever the ambient light is above a given level. The lens cover 29b, which is mounted on the front cover bezel 24, permits adjustment in the amount of ambient light conducted to the photocell 28 by the light pipe 29a.

As shown in FIG. 3, the switch assembly is adapted to be installed in the electrical box (not shown) of an existing wall mounted light switch. By way of example, the switch assembly controls a light bulb 16 in a wall mounted light fixture which in turn is hard wired to the switch assembly 15. However, the switch assembly may control a ceiling mounted light fixture or an electrical outlet into which is plugged a lamp or other functional device to be controlled.

Figure 5:
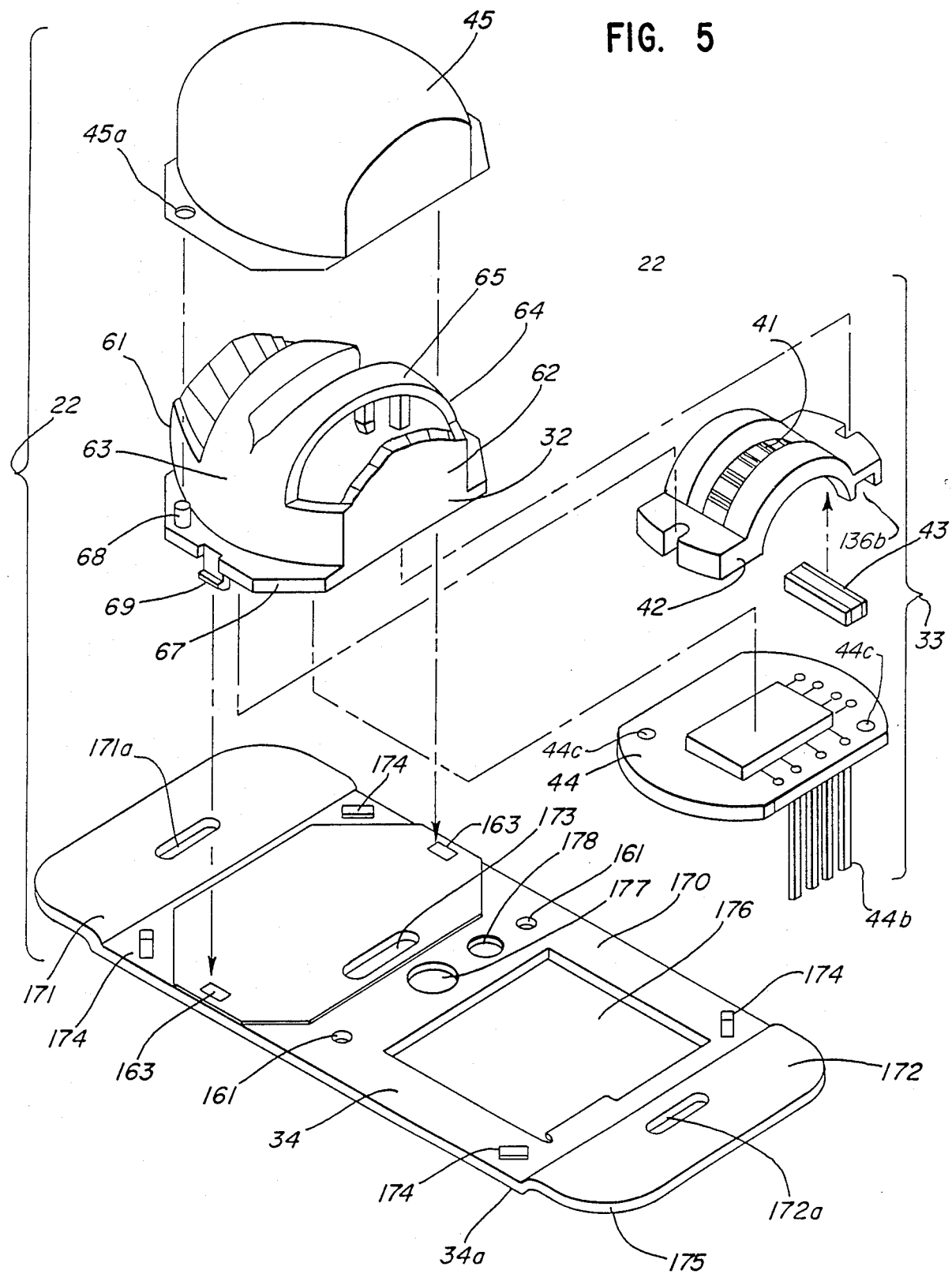
FIGS. 5 and 5A are an exploded perspective view of the switch assembly.

Referring to FIG. 5 in conjunction with FIGS. 1 and 2, the sensor module 22 of the switch assembly 15 includes an optic shell 32 which defines reflective surfaces for focusing onto a sensor 41 infrared radiation produced by a person moving within the detection field of the switch assembly. As shown in FIG. 2, the optics shell 32 projects through an opening 23a in the front surface of the switch plate 23, and extends outwardly forward of the switch plate. This locates reflecting mirrors 70 and 80, (FIG. 1) to receive infrared radiation in an arc 180° in radius extending around the switch assembly from its left to right sides.

As will be shown, the switch assembly 15 responds to the presence of a source of infrared radiation moving in the detection fields of the switch assembly to energize the light bulb 16. For purposes of illustration, the switch assembly 15 is described as responding to movements of a person within a room or space. However, the switch assembly responds to changes in infrared radiation levels and anything hotter or colder than ambient would be detected. The switch assembly maintains the light bulb 16 energized as long as the person remains in the sensing field of the switch assembly 15 and movement of the person is sensed by the switch assembly. Once activated following the detection of infrared radiation, the switch assembly maintains the light bulb energized for a preset time period, adjustable for example, from ten seconds to eight minutes, even after movement of the person is no longer sensed. This delayed turnoff feature enables the switch assembly to keep the light bulb lit even though the person leaves the room or remains motionless in the room as when sitting down reading or watching television.

The switch assembly 15 senses infrared radiation over a 180° range in horizontal planes. The sensing range includes two separate fields of view, including a generally horizontal "look-out" or far field which extends forwardly of the switch assembly and a more vertical "look-down" or near field which extends forwardly and downwardly at a semivertical angle a1 relative to the horizontal. In one switch assembly which was constructed, the angle a1 was 32°. Each field in vertical planes extends approximately 5° on either side of center lines, represented by the dashed lines 30 and 31 for the "look-out" field and the "look-down" field, respectively.

The effective lengths of sensing ranges for the "look-out" field and the "look-down" field are determined by the composition and configuration of the sensor used and by the size of the room in which the switch assembly is mounted. The sensor used in an exemplary embodiment had a maximum sensing range on the order of 20 feet. Preferably, the switch assembly 15 is mounted on the wall of a room at a height of four feet, the standard height for wall switches. In such position, the sensing range for the "look-out" field extends at a radius of approximately twenty feet from the switch assembly at a height of four feet. As indicated the vertical extent of the "look-out" field is 10°, i.e. 5° on either side of the horizontal center line. The maximum "look-down" field range for a semivertical angle of 32° is within a radius of approximately 3½ feet at floor level from the location of the switch assembly.

Generally, a person moving within the room will be within the look-out field unless that person is less than four feet tall or the person sits down. The look-down field is effective in certain of these conditions to turn the light on and/or maintain the light on. Thus, generally, the switch assembly is mounted in the wall light switchbox adjacent to a doorway to assure that a person of virtually any height entering the room is detected. A person entering the room through the doorway would have to pass through the "look-down" field and would then cause the light bulb to be lit and remain lit for at least the duration of the delayed turn off period. Assuming that the person moves to the center of the room, the person will pass out of the "look-down" field and should eventually pass into the "look-out" field because its vertical range increases in correspondence with distance from the location of the switch assembly, movements within either sensing fields being detected by the switch assembly to maintain the bulb lit.

For the "look-down" field, there is a semi-circular dead zone having a radius of approximately two feet measured from a point directly beneath the switch assembly. However, a person would have to be less than two feet tall to fail to be sensed by the switch assembly.

Thus, with an effective sensing range of approximately twenty feet, if the distance in a horizontal plane, from the switch assembly to each wall of a room is less than twenty feet, the wall mounted switch assembly 15 defines a sensing area for the switch assembly which covers an entire room, permitting detection of the movements of a person at least four feet tall anywhere in the room.

Figure 4:
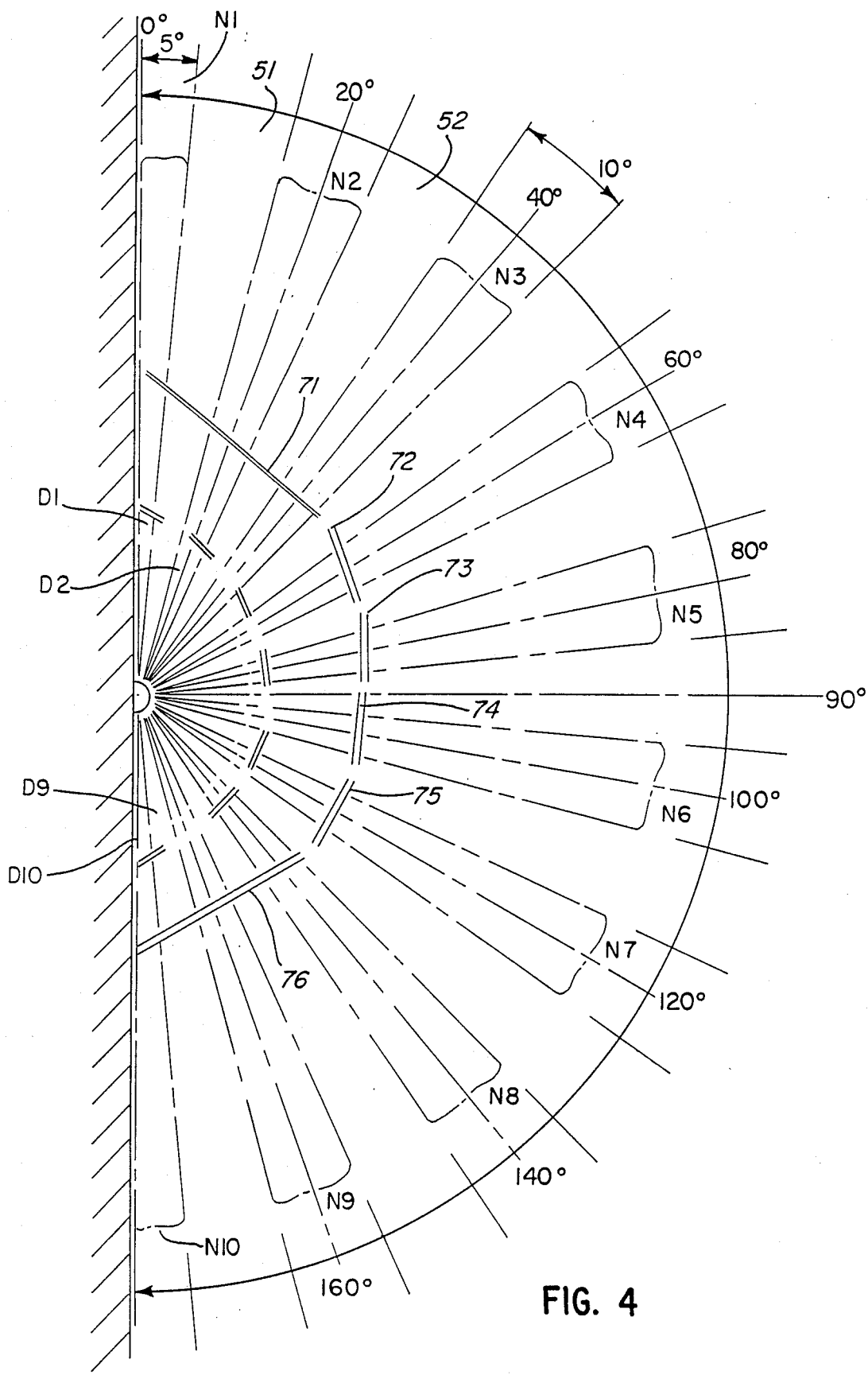
FIG. 4 is a downward plan view of the look-out field and look-down field for the switch assembly.

Referring to FIG. 4, as will be shown, the switch assembly 15 provides a 180° "look-down" field having a generally horizontal sensing field approximately 180° in angular extent, providing ten "look-out" sensing zones N1–N10 for the switch assembly. The sensing field is in the shape of a half cone. The end sensing zones N1 and N10 have an angular width of approximately 5°. Each of the other sensing zones N2–N9 has an angular width of approximately 10°, and is, for example, approximately 36" wide at a distance of about twenty feet radially outward from the switching assembly which is located at the mid-point. The longer the range, the greater the arc and the wider the field of view will be.

The sensing zones N1–N10, and the spaces between adjacent zones, such as space 51 between zones N1 and N2, space 52 between zones N2 and N3, etc., are determined by the configuration of the optical system and of the infrared sensor of the switch assembly as will be described.

Referring to FIG. 4, the "look-down" field is also in the shape of a half cone sensing field which has the same projections in a horizontal plane as the "look-out" field but is at the semivertical angle al. The "look-down"

field includes ten "look-down" sensing zones which are defined similar to the sensing zones N1–N10. The "look-down" sensing zones have been labeled D1, D2, . . . D9, D10 in FIG. 4. The end sensing zones D1 and D10 have an angular extent of 5°. Each of the other sensing zones, such as zones D2 and D9, has an angular width of approximately 10° and is approximately 12" wide at a distance of 3½ feet radially outward from the switch assembly.

Referring to FIGS. 1–4, in summary, as indicated above, the control switch assembly 15 is mounted in a switch box in a wall within a room, generally on one side of a doorway, performing the function of the wall switch which would normally be mounted in such switch box. The switch assembly 15 controls the energization of a light bulb 16 in response to movement of a person within the room.

Referring to FIGS. 3 and 4, as indicated, the switch assembly senses infrared radiation in a generally horizontal look-out field 180° in angular width and having ten zones N1–N10, sensing zones N2–N9 being 10° in angular width and zones N1 and N10 being 5° in angular extent. In addition, the switch assembly senses infrared radiation in a shallow vertical 180° look-down zone at a semivertical angle of 32° in the illustrative embodiment. The look-down field also includes ten sensing zones D1–D10, including eight zones D2–D9 which are 10° in angular extent and two zones D1 and D10 which are 5° in angular extent.

Thus, when a person enters the room through the doorway, and moves into the room, the person will move through several of the look-down zones D1–D10, such as zone D1, and assuming that the person is at least four feet tall through several of the look-out zones N1–N10, such as zones N1, N2, etc., in succession. Upon entering the room, the person first moves into zone D1 and N1. The infrared radiation emitted by the person will be sensed in zone N1 of the look-out field, causing the light bulb 16 to be lit. A person less than four feet tall will be detected by infrared radiation sensed in zone D1 of the look-down field which would cause the light bulb 16 to be turned on. For a room having a maximum distance of 20 feet from the switch assembly mounting location to any wall laterally or forwardly of the switch assembly, movements of the person within the room will be sensed, maintaining the light bulb 16 lit. Because the switch assembly is mounted at a height of only four feet, and because its vertical field increases with distance from the switch assembly, infrared radiation generated by a person at least four feet tall will be sensed at virtually every point in the room.

If the person is less than four feet tall, as such person moves past the switch assembly 15 and into the room, the person will eventually pass out of the look-down sensing field, when the person reaches a point approximately 3½ feet forward of or to either side of the switch assembly. However, as indicated, the vertical extent of the look-out field increases as a function of distance away from the switch assembly 15 and at a distance 3½ feet from the location of the switch assembly, the vertical extent is approximately 12". Accordingly, a person at least three feet tall would be sensed by the look-out field at a distance of about 3½ feet from the location of the switch assembly.

As long as the person continues to move within the room and within the sensing fields of the switch assembly, infrared radiation generated by that person will be sensed, maintaining the light bulb lit. Even if the person sits down within the room, the slightest movement of the person will serve to maintain the lamp lit. When infrared radiation fails to be sensed within the turn off delay time provided by the switch assembly, the light bulb will be turned off.

Switch Assembly

Figure 5A:
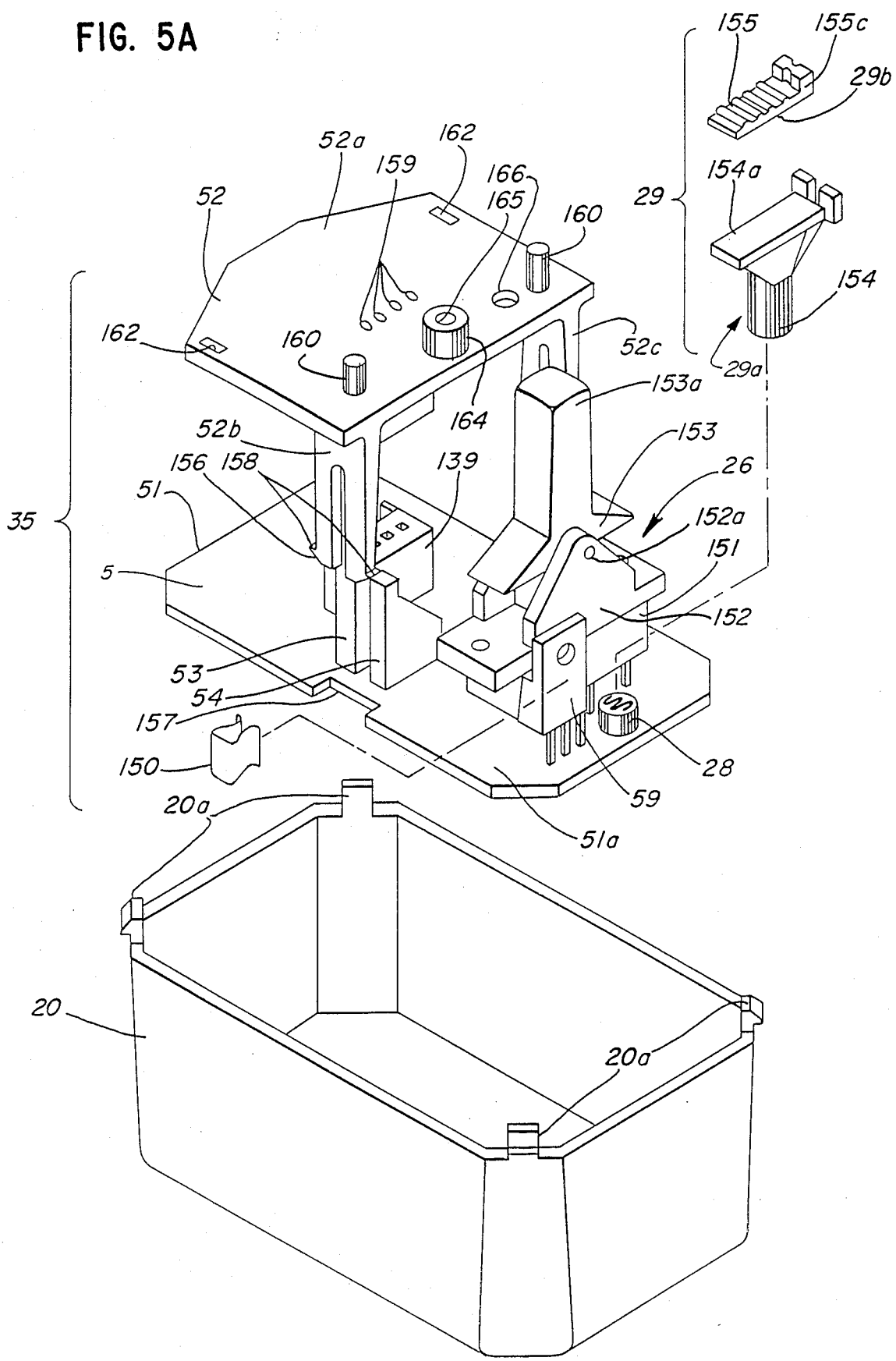

Referring to FIGS. 5 and 5A, assembled as shown in FIG. 5B, there is provided an exploded perspective view of the housing 20 and sensor module 22 of the switch assembly 15 in simplified form. The switch assembly 15 is oriented in the vertical direction in FIGS. 5 and 5A, for clarity of the drawings, but as shown in FIGS. 1 and 2, in use, the switch assembly is oriented in a horizontal direction. Thus, in the following description, upper and lower surfaces, and forward and rearward surfaces of the elements of the assembly are as for the normal use position (FIGS. 1 and 2). As shown in FIG. 5, the sensor module 22 includes an optics shell 32, a sensor assembly 33 and a mounting bracket 34. The sensor module 22 further includes a circuit assembly 35, shown in FIG. 5A.

Referring to FIG. 5, the sensor assembly 33 includes an infrared sensor 41, a sensor carrier 42, a connector 43, and a sensor printed circuit board 44. The sensor assembly 33 is adapted for mounting within the optics shell 32. As will be shown, the optics shell 32 in turn is adapted for mounting on the mounting bracket 34 with the sensor assembly 33 contained therewithin. A sensor lens 45 encloses the upper portion of the optics shell 32.

With reference to FIGS. 5 and 5A, the housing 20 is a hollow box-like member rectangular shape and which is open at its forward end. The mounting bracket 34 is adapted for mounting on the housing 20 at its open end with the circuit assembly 35 attached to the under surface 34a of the mounting bracket 34 and depending therefrom and located in the housing 20 in the assembled unit.

The circuit assembly 35 includes a printed circuit board 51, a printed circuit board mounting bracket 52, and a pair of PUSH-LOK wire type wire terminals 53 and 54. The circuit assembly also includes the mode switch 26, photocell 28 and light lens assembly 29.

Optics Shell

Considering the optics shell 32 in more detail, with reference to FIGS. 6–9, the optics shell 32 is a one-piece molded unit of a rigid material having electrically insulating characteristics and which is metalized all over and conductive at line voltage, acting as a shield for the sensor 43 (FIG. 5) contained therewithin when the unit is assembled. One such material suitable for this use is Cyclolac ABS, commercially available from Borg-Warner. Preferably the reflective material is aluminum and is applied to the optics shell 32 by vacuum deposition.

Referring to FIGS. 5–8, the optics shell 32 has a generally semi-ellipsoidal cross-section defined by a pair of flat upper and lower walls 61 and 62 having flat outer surfaces 61a and 62a and arcuate side walls 63 and 64, the side walls being joined by an integrally formed arcuate bridge 65 which defines the forward surface of the optics shell 32. The bridge 65 extends over only the middle one-third of the forward surface of the optics shell defining openings 78 and 79 at the top and bottom of the forward surface of the optics shell. A mounting flange 67 extends around the periphery of the optics shell at its open rearward end. The upper surface 67a of the flange 67 defines a pair of horizontally extending posts 68 which index the lens 45 (FIG. 5) to the optics shell. The lens 45 is provided with apertures 45a which receive the posts 68. The flange further defines a pair of depending hooks 69 which facilitate attachment of the optics shell to the mounting bracket 34 (FIG. 5) as will be shown.

Referring to FIGS. 6–9, the upper wall 61 defines a curved reflective mirror 70 generally convex in shape and including six generally trapezoidal shaped flat segments 71–76 formed as an integral arcuate projecting downwardly and inwardly at an angle c1, relative to the plane of the upper wall 61 into the cavity of the optics shell from the front edge of the upper wall 61. As shown best in FIG. 6, the innermost or lower edge 70a of mirror 70, and thus edges of the elements 71–76 terminate at a height corresponding approximately to the upper edge 65a of the arcuate bridge 65.

Similarly, the lower wall 62 defines on its upper surface a reflective mirror 80, generally convex in shape, comprised of six flat segments 81–86. The segments 81–86 project upwardly and inwardly into the cavity of the optics shell from the front edge of the lower wall 62 and towards the rear of the optics shell. The segments 81–86, which are generally trapezoidal in shape, are divided into pairs of elements 81a–86a and 81b–86b along a fold line 87. Elements 81a–86a extend at the same angle c1 as elements 71–76 whereas elements 81b–86b extend at a less acute angle d1. The inner segments 72–75 are 20° in arcuate width, with the centermost segments 73 and 74 having their axis offset 10° from the center axis of the optics shell. The planes of segments 71–76 are inclined at an angle c1 of 30° relative to the plane of the upper wall. Thus, referring to FIG. 4, segments 73 and 74 which, in part, define respective sensing zones N5 and N6 are centered on axis at 80° and 100°, segments 72 and 75 which define sensing zones N4 and N7 at 60° and 120°. Segments 71 and 76 which define zones N1–N3 and N8–N10 extend over a range of 0° to 50° and 130° to 180°.

Similarly, inner segments 82–85 are 20° in arcuate width with the centermost segments 83 and 84 having their axis offset 10° from the center axis of the optics shell. The planes of segments 81a–86a are inclined at an angle c1 of 30° relative to the upper wall, and segments 81b–86b are inclined at angle d1 of 16° relative to the upper wall. Segments 83,84 and 82,85 and 81,86 which define respective sensing zones D5,D6 and D4,D7 and D1–D3, D8–D10, are disposed on the same angular displacements as segments 73,74 and 72,75 and 71,76, respectively.

Segments 71–76 and 81a–86a define the "look-out" reflector surfaces for the optics shell. Segments 81b–86b define the look-down reflector surfaces for the optics shell.

The mirrors 70 and 80 extend in a generally parallel opposing relation with one another, with mirror 80 being located on the top inner surface of the optics shell 32 and mirror 70 being located on the lower inner surface of the optics shell 32. The openings 78 and 79 permit infrared radiation to impinge on the mirrors 70 and 80 from the front of the optics shell 32.

The inner surface of the arcuate bridge 65 defines the focusing mirror 90 which includes two major reflective surfaces 91 and 92 and two minor reflective surfaces 93 and 94. The major reflective surfaces 91 and 92 are formed as spherical surfaces having a radius of curvature in the vertical plane of 0.781 for the in use orientation of the optics shell. The minor reflective surfaces 93 and 94 have a radius of curvature of 1.036 in the vertical plane for the in use orientation of the optics shell. The focusing mirrors 91–94 define the 10° sensing width in the vertical direction for the look-down field and the look-out field. Surface 91 slants forwardly and upwardly, terminating in an inwardly projecting reflective edge portion defining reflective surface 93. Reflective surface 92 slants forwardly and downwardly, terminating in an inwardly projecting edge portion defining reflective surface 94. The reflective surfaces 91 and 94 focus on the sensor infrared radiation impinging on the segments 71–76 of the mirror 70 located in the upper portion of the optics shell. The reflective surface 92 focuses onto the sensor infrared radiation impinging on the segments 81a–86a of the mirror 80 in the lower portion of the optics shell. The mirror segment 93 focuses onto the sensor infrared radiation impinging on segments 81b–86b of the mirror 80 in lower portion of the optics shell.

Index members 95 and 96, projecting rearwardly from the forward inner surface of the optics shell at opposite ends of the arcuate member index the optics shell 32 to the sensor holder 42 (FIG. 5) as will be shown. Index pins 97 extending rearwardly from diametrically opposed positions at rearward corners of the top and bottom walls index the optics shell to the sensor printed circuit board.

Sensor Assembly

Referring to FIGS. 10–15, the infrared sensor 41 may, for example be the type disclosed in the U.S. Pat. No. 4,379,971. The sensor 41 comprises a pliable pyroelectric film material 101 such as polyvinyldine fluoride (PVF2) which forms the base substrate for the sensor.

Briefly, the surface 102 of the pyroelectric material 101 which is designated as the front of the sensor is essentially covered with a continuous overlay 103 of an electrically conductive material which forms an electrostatic shield and a solid electrode for one side of the radiation sensor. The electrode arrangement provides six enlarged fingers 106a–106f, alternate fingers 106a, 106c, and 106e interconnected in electrical series by conductor 105 to form one electrode 109 and fingers 106b, 106d, and 106f interconnected by conductor 110 to form a second electrode 111.

The infrared sensor is arranged in an elongated rectangular configuration so that energy striking the mirrors 70, 80, 90 (FIG. 8) is focused on the surface of the sensor generally along its longitudinal axis as the source of radiation moves within the sensing field.

As a source of infrared energy in the horizontal plane that is being observed, passes in front of the mirror, a varying output signal from the sensor is generated. As the focused energy is aligned with one set of electrodes 109 or 111, the output voltage from that set of electrodes will be increased generally in a positive direction and the output from the other electrode set will remain essentially constant. The six electrode "fingers" define six sensing zones for each sensing field. The optical systems reverse the direction of the sweep of the focused radiation when the radiant energy is directed to the outermost "fingers" 106a and 106f. As the focused energy is directed between the two electrodes minimum output signal is provided by the sensor, these intermediate areas thus defining the "spaces", between sensing zones, such as N1, N2 and N2, N3, etc.

As the energy source moves to the left, for example, the localized focus F of the energy on the surface of the sensor moves to the right to point F1 as illustrated and the output voltage from electrode (i.e. finger 106a) will increase. As the focus point of the energy moves across the sensor in the axial direction away from point F1, the output from the electrode 109 returns to the original voltage. The output voltage from the other electrode (i.e. finger 106b) will progressively increase as the focus point of the energy moves toward point F2 and approaches finger 106b of this electrode. As the focus point crosses an electrode and moves toward point F3, the output from the electrode will again return to its original voltage with an increase again being observed in the voltage output for electrode as the focus point of the energy approaches finger 106c.

The sensor holder 42 has a generally arcuate center portion 131 defining a pair of spaced apart bridge members 132 and 133, defining a rectangular opening 134 therebetween, and joined at their bottom ends by end portions 135 and 136. The inner surface of the arcuate members 132 and 133 is cut away represented by the dashed line 137 defining a recessed inner surface 138 which receives the flexible sensor 41 (FIG. 14).

Figure 16:
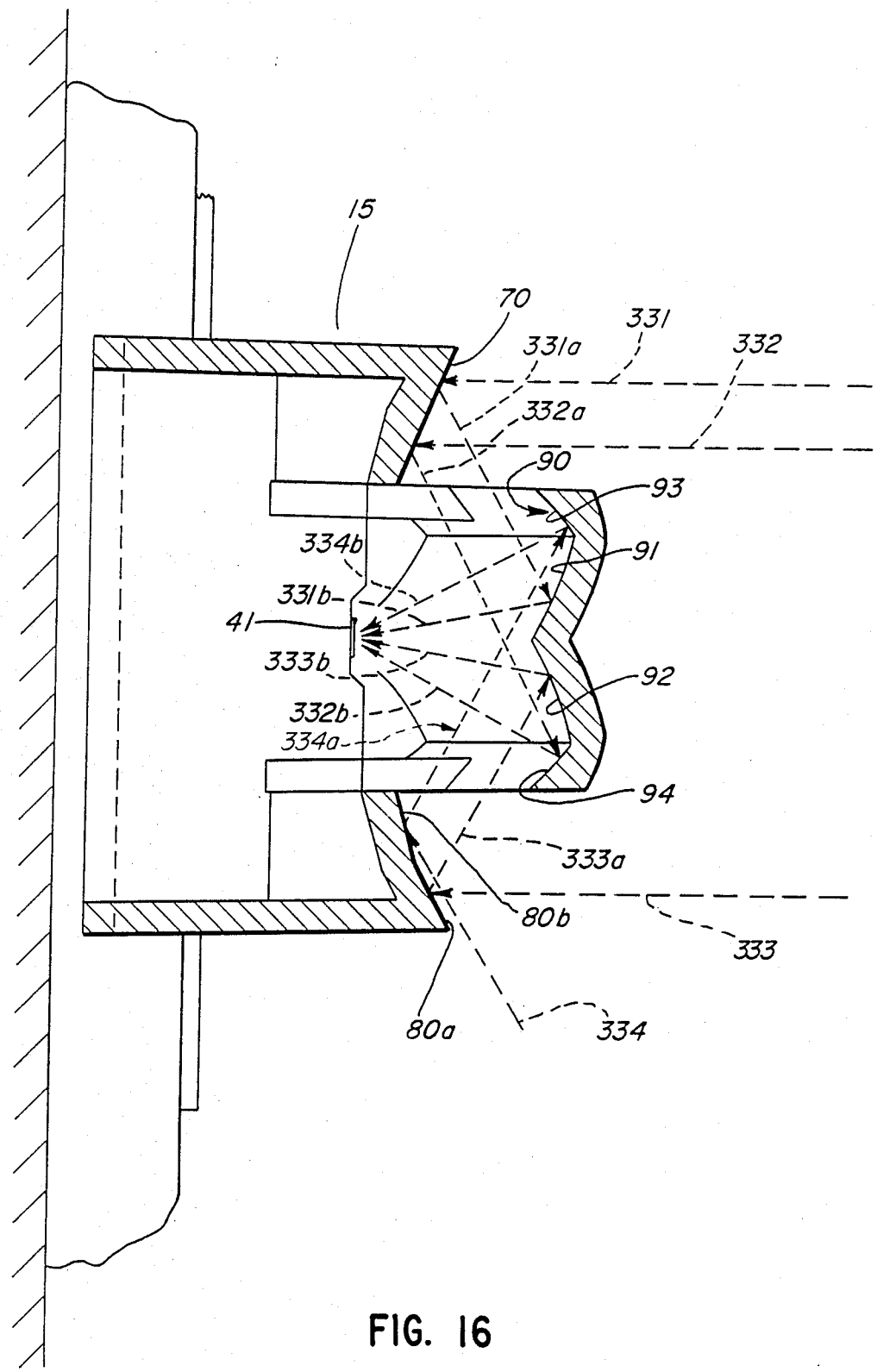
FIG. 16 is a simplified side sectional view of the switch assembly mounted in a wall, illustrating ray patterns.
Figure 16A:
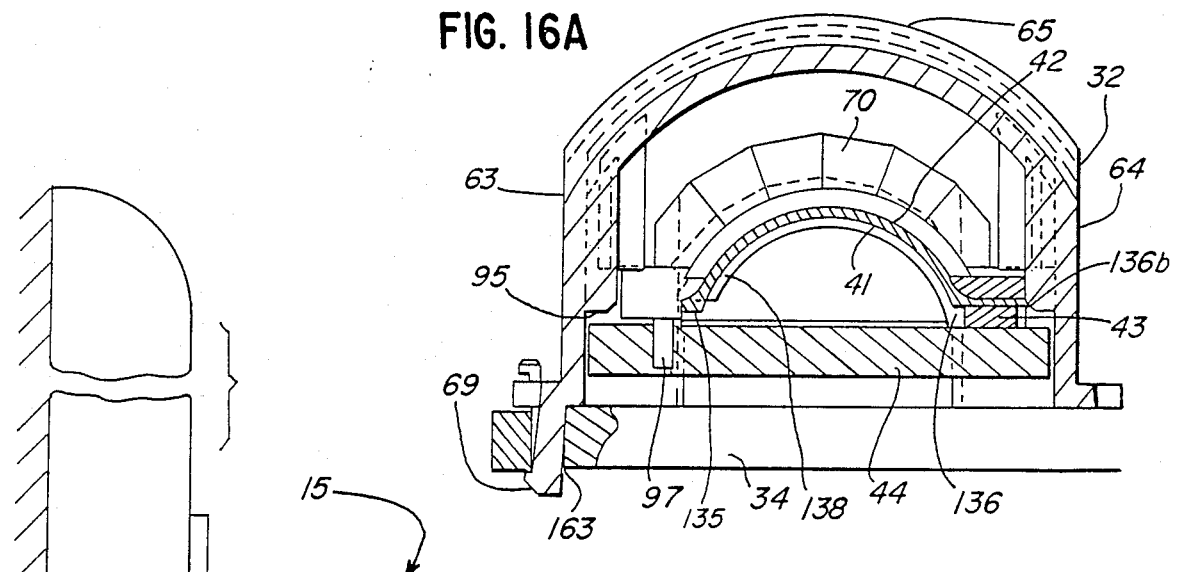
FIG. 16A is a partial sectional view of the sensor assembly.

The radius of curvature of the center portion 131 corresponds generally to one-half the radius of curvature of the inner surface of the arcuate bridge portion 65 of the optics shell (FIG. 7) at the junction of the two major reflective surfaces 91 and 92, to locate the sensor 41 at the focal point for focusing mirrors 90 (FIG. 8) which for the spherical mirrors is at one half the radius of curvature of the mirrors as shown in FIG. 16A. As shown in FIG. 5, portions of the fingers 106a–106f of the sensor element are exposed to view through the channel or opening 134 defined by the spaced apart members 132 and 133.

Figure 9:
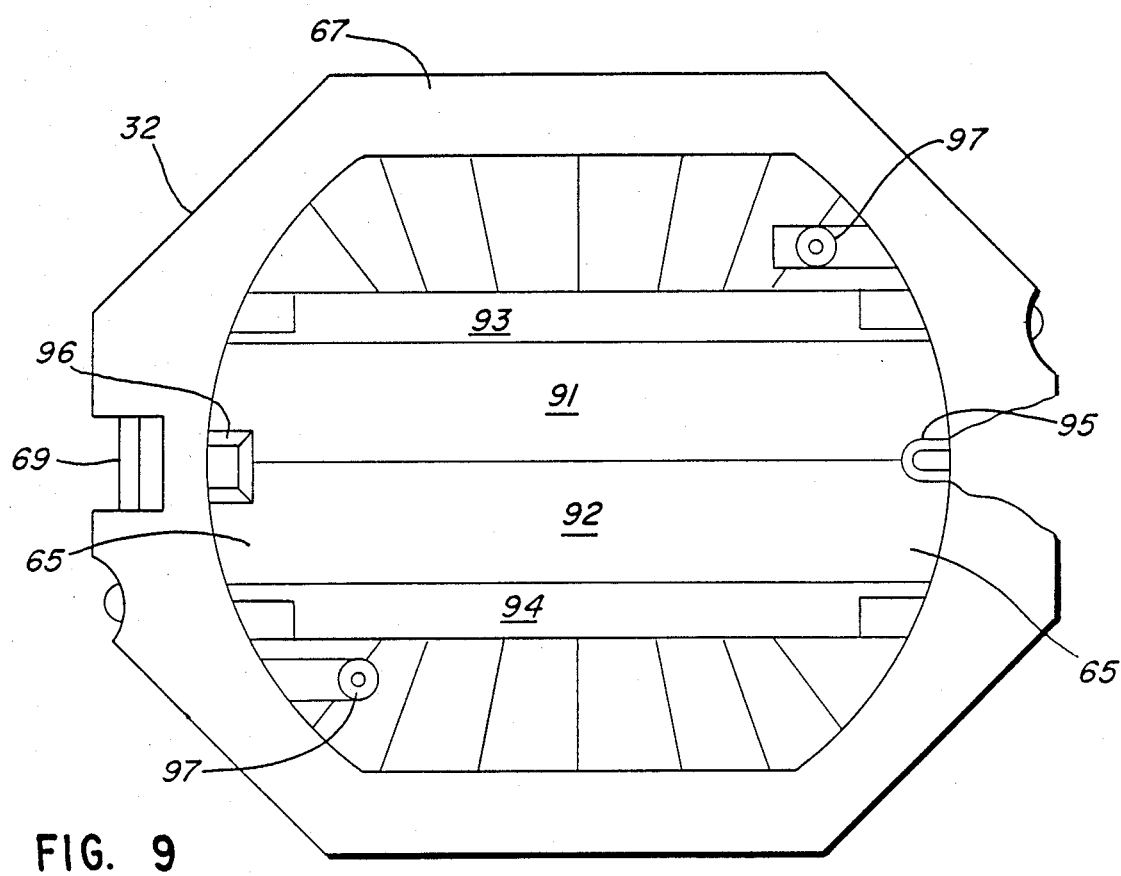
FIG. 9 is a top plan view of the optics shell for the switch assembly.

The ends of the holder define indexing slots 139, 139a, the slot 139 being semi-circular for end portion 135 and the slot 139a being generally rectangular for end portion 136. These keyed apertures register with the pins 95,96 on the optics shell 32 (FIG. 9). End portion 136 has legs 136a spaced apart to define a generally rectangular trough 140 on its undersurface which receives the Zebra connector 43 (FIG. 5) for connecting the electrodes of the sensor to the control circuit as will be shown. Legs 136a and legs 135a on end 135 support the holder 42 on the printed circuit board with the sensor 41 spaced from the upper surface of the printed circuit board.

Referring to FIG. 5, the Zebra connector 43 interconnects the electrodes of the sensor with conductors 44a on the printed circuit board 44. The sensor printed circuit board 44 carries the input stage of the control circuit (FIG. 18), including operational amplifiers 187 and 187a and the associated components enclosed within the dashed line. The input stage has four output conductors 42c connected to four output terminals 44b extending downwardly from its undersurface for connecting the signal outputs of the input stage to signal processing and output stages of the control circuit by way of connector block 139 carried on the printed circuit board 51 (FIG. 5A).

Circuit Assembly

Figure 18:
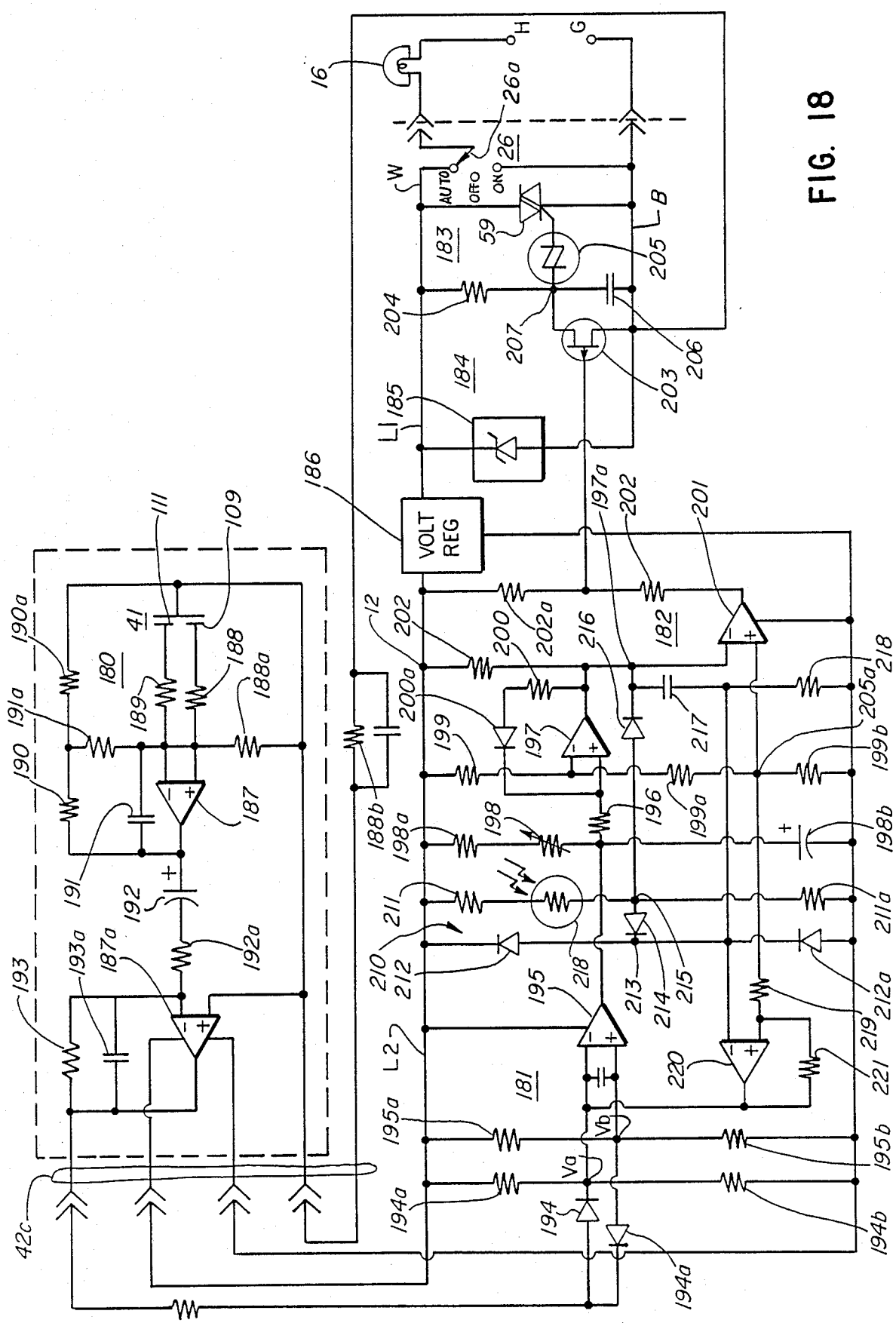
FIG. 18 is a schematic circuit diagram for the switch assembly.

Referring to FIGS. 5A and 18, the printed circuit board 51 mounts the components of the control circuit, shown in diagrammatic form in FIG. 18. The control circuit responds to the infrared sensor 41 and generates control signals for causing energization and deenergization of the light bulb 16 (FIG. 3) controlled by the switch assembly 15. The output stage of the control circuit includes a triac 59 which is connected in series with the light bulb 16 being controlled and the power conductors.

The two electrical contact assemblies 53,54, embodied as PUSH-LOK type wire terminals, are mounted on the printed circuit board to facilitate connection of electrical power to the circuit carried by printed circuit board. The electrical wires (not shown) of the electrical wiring installation in which the switch assembly is installed are plugged into the terminals through openings in the connector body 27 (FIG. 2) formed in the rear wall 20a of the housing 20.

The mode switch 26 is mounted on the printed circuit board 51 near its lower edge 51a. The mode switch 26 includes a conventional slide switch 151 having its terminals extending outward from its rearward surface into apertures (not shown) in the printed circuit board 51, for connecting the switch 151 into the control circuit. A toggle assembly including a pivot 152 and toggle arm 153 is mounted on the forward surface of the switch 151, the toggle arm 153 having a hollow bore (not shown) at its base which overlies the switch arm (not shown) of the slide switch 151, enabling the switch arm to be operated between its three positions by pivoting the toggle arm 153 about the pivot axis 152a.

As shown in FIGS. 1 and 2, the free end 153a of the toggle arm 153 extends through an opening 24a in the forward surface of the cover bezel 24 to permit operation of the switch to select the operating mode for the switch assembly.

Referring again to FIG. 5A, the photocell 28 is mounted on the printed circuit board at its lower edge 51a. The light lens assembly 29 includes light pipe member 29a and lens cover 29b. The light pipe member 29a is a generally "T" shaped element having a generally rectangular shank portion 154 which terminates in a generally flat rectangular top lens portion 154a which extends horizontally in the switch unit and serves as a light collector to focus or channel ambient light from outside of the switch assembly to the shank of the light pipe member, the tip of the shank being located in overlying relationship to the photocell 28 in the assembled switch unit. The lens cover 29b is a generally rectangular element with a ridged or serrated upper or forward surface 155, the element conforming in size and shape to the rectangular lens portion of 154a of the light pipe member 29a and adapted to slide along the forward surface thereof into a channel (not shown) in the forward portion of the bezel 24.

Referring to FIG. 1, when the lens cover 29b is operated to the left, as viewed in FIG. 1, the lens cover is moved out of the way, exposing the upper light collecting surface 154a of the light pipe member 29a. This transmits maximum ambient light to the photocell 28. When the lens cover 29b is moved to the right such that the handle portion 155c abuts the right wall 24b of the opening in the bezel 24, the ridged surface 155 of the lens cover 29b reflects away ambient light, minimizing the amount of ambient light which is transmitted to the photocell 28.

Referring to FIGS. 5 and 5A, the printed circuit board mounting bracket 52 includes a generally trapezoidal shaped plate portion 52a having a pair of bifurcated legs 52b and 52c depending therefrom, the free ends of the legs terminating in hook portions 156 which pass through slots 157 formed on the opposite sides of the printed circuit board 51, with outwardly projecting shoulders 158 engaging the under surface of the printed circuit board 51 for supporting same. The upper surface of the plate 52a has a plurality of apertures 159 formed therethrough and aligned with the openings in the terminal connector 139 through which pass the terminals 44b of the sensor assembly (FIG. 5) in the assembled unit. A pair of posts 160 extend upwardly from the surface 52a to facilitate securing the mounting bracket 52 to the printed circuit board mounting bracket 34 as by swaging. The posts 160 pass through apertures 161 (FIG. 5) in the mounting bracket 34. The plate 52a has a pair of generally rectangular slots 162 formed near its upper edge on either side thereof and which are aligned with correspondingly shaped slots 163 in the mounting bracket 34 and through which pass the hooks 69 of the optics shell 32 when the unit is assembled. The plate 52a also includes a boss 164 which includes a threaded insert 165 which facilitates mounting or securing the duplex cover plate (FIG. 1) and front cover bezel 24 to the unit by the screw 25. An aperture 166 in the plate 52a enables access to a trim potentiometer 198 (FIG. 18) connected in the control circuit for adjusting the turn off delay time of the control circuit for the switch assembly.

Continuing to refer to FIGS. 5 and 5A, the mounting bracket 34 is generally rectangular in shape and has its upper and lower end portions 171 and 172 extending offset relative to the plane of the main body portion 170 of the mounting bracket 34 and provided with apertures 171a and 172a to facilitate attachment of the mounting bracket and the elements supported thereby to the switch box. The slot 173 is aligned with apertures 159 in plate 52a to provide pass through for the terminals of the sensor printed circuit board 44 to the connector 139 carried on the printed circuit board. Boss 164 on the printed circuit board mounting bracket 52 passes through an aperture 177 at the center of the mounting bracket 34. Aperture 178 is aligned with aperture 166 to provide access to the potentiometer 198 (FIG. 18) for adjusting the turn off delay time. A projection 175 at the rearward side of the mounting bracket 34 at its lower end connects the triac 59 to the metal mounting bracket which serves as a triac heat sink, the triac 59 being secured to the projection 175 in heat transfer relationship by a retainer clip 150.

The mounting bracket 34 is provided with four rectangular apertures 174 near the corners of its main body portion 170 through which pass the hooks 20a at the upper surface of the housing 20, providing a snap fit for securing the mounting bracket 34 to the housing 20. A generally rectangular opening 176 is provided at the bottom of the mounting bracket 34 to provide a pass through for the toggle switch assembly 26 and the light pipe assembly 29.

Control Circuit

Referring to FIG. 18, the control circuit includes an input stage 180, a comparator stage 181, a drive stage 182, an output stage 183 and a power supply stage 184.

The power supply stage 184 includes a 24 volt Zener diode bridge network 185 connected between the ground conductor B and hot conductor W providing an unregulated voltage at 24 VDC between conductor L1 and ground conductor B. This voltage is applied to a voltage regulator 186 which applies a regulated DC voltage at 12 VDC between conductor L2 and ground B.

The sensor 41 is connected to the input stage 180 which comprises a pair of operational amplifiers 187 and 187a which are connected in tandem for operation as a low pass filter to filter out 60 Hz noise. Amplifier 187 has its non-inverting input connected through a resistor 188 to sensor electrode 109 and through resistor 188a and a further resistor 188b to the ground reference. The inverting input of amplifier 187 is connected through a resistor 189 to electrode 111 of the sensor 41. The output of amplifier 187 is connected through resistors 190 and 190a and through resistor 188b to the ground reference and is connected through a feedback network including a capacitor 191 to the inverting input of the amplifier 187. The inverting input of amplifier 187 is also connected through a resistor 191a to the junction of resistors 190 and 190a. The output of the amplifier 187 is also coupled trough a capacitor 192 and a resistor 192a to the inverting input of the amplifier 187a which has its non-inverting input connected to the ground reference and its output connected through parallel connected resistor 193 and capacitor 193a to the inverting input of the amplifier 187a.

The output of amplifier 187a of the input stage 180 is connected to the input of the comparator stage 181 which is comprised of a pair of diodes 194, 194a and a comparator 195 connected for operation as a window comparator circuit to provide an output indicative of whether or not the input signal provided by the sensor 41 is within a predetermined range.

The output of amplifier 187a is connected through diode 194 to the inverting input of comparator 195. A voltage divider comprised of series connected resistors 194a and 194b is connected between conductor L2 and ground establishing a reference voltage Va at the inverting input of comparator 195, which is connected between the junction of resistors 194a and 194b. The non-inverting input of comparator 195 is connected through diode 194a to the output of amplifier 187a and to the junction of series connected resistors 195a and 195b which establish a reference voltage Vb at the non-inverting input of the comparator 195.

The output of comparator 195 is connected through a resistor 196 to the non-inverting input of a comparator 197. A time delay network including series connected potentiometer 198, a resistor 198a and capacitor 198b are connected between conductor L2 and ground, the junction of potentiometer 198 and capacitor 198b being connected through resistor 196 to the non-inverting input of comparator 197. Capacitor 198b provides a time delay shutoff feature to maintain the drive stage enabled for a time interval, such as four minutes, following termination of detection of infrared radiation by the input stage. Comparator 197 has its inverting input connected to a voltage divider formed by resistors 199, 199a and 199b which are connected in series between conductor L2 and ground. The output of comparator 197 is connected through resistor 200 and diode 200a to its non-inverting input, and to the inverting input of comparator 201 of the drive stage 182 and through resistor 202 to conductor L2. Comparator 201 has its non-inverting input connected to a reference potential at the junction of resistors 199a and 199b at point 205.

The output of comparator 201 is connected through a resistor 202 to the gate of a field effect transistor 203 which has its source-to drain circuit connected in series with a resistor 204 between the line input at the conductor W, which is connected to the hot wire terminal through the lamp 16 and the conductor B which is connected to the ground terminal.

The output stage 183 includes the triac 59, a breakover device 205 and a capacitor 206. The triac is connected in series with the lamp 16 between the conductor W connected to the hot terminal and the conductor B connected to the ground terminal. The breakover device 205 is connected between the gate of the triac 59 and the drain electrode of the field effect transistor 203 at the output of the drive stage 182 at point 207. A capacitor 206 is connected between the output of the drive stage 182 at point 207 and the conductor B connected to ground terminal.

Mode switch 26 is connected in shunt with the triac 59 with its terminal "AUTO" connected to the conductor W, its terminal "OFF", unconnected, and its terminal "ON" connected to ground. The switch arm 26a is connected to one side of the lamp, the other side of which is connected to the hot wire of the AC power source.

For the purpose of inhibiting the control circuit during daylight hours, the photocell 28 is connected in an inhibit network 210 to provide an inhibit input to comparator 201. The photocell 28 is connected in series with resistors 211, 211a between conductor L2 and ground. Diodes 212, 212a which are connected in series between ground and conductor L2 provide a reference voltage at point 213. A diode 214 is connected between the junction of the photocell 28 and the resistor 211a at point 215 and point 213. Diode 216 connects point 215 to the inverting input of comparator 201. The cathode of diode 216 is connected through capacitor 217 and a resistor 218 to ground.

The reference voltage applied to the non-inverting input of comparator 201, at point 205a, is also connected through a resistor 219 to the non-inverting input of a comparator 220 which has its inverting input connected to the junction of diodes 212, 212a and its output connected to the inverting input of comparator 195. A resistor 221 is connected in a feedback path between the output of comparator 220 and its non-inverting input.

Assembly

In assembling the switch assembly 15, referring to the circuit assembly 35, FIG. 5A, the printed circuit board mounting bracket 52 is mounted on the printed circuit board 51 with its bifurcated legs 52b and 52c positioned with their hooked end portions 158 located in the lateral slots 158 on either side of the printed circuit board 51. The circuit assembly 35 is then secured to the under surface 34a of the mounting bracket 34, FIG. , with posts 160 extending through apertures 161 in the mounting bracket and swaged to secure the circuit assembly 35 to the mounting bracket 34. The tab 175 is connected to the triac 59 by clip 150 to heat sink the triac to the mounting bracket 34.

Referring now to FIGS. 5-9 and 16A, in the sensor assembly 33, the sensing element 41 is located in the recess formed in the under surface of the sensor holder 42 and connector 43 is located in the channel 136b. The sensor holder 42 and sensor 41 thus assembled are positioned on the sensor printed circuit board 44, and this sub-assembly is positioned on the mounting bracket 34 with terminals 44b extending through aperture 173 with their distal end plugged into the connector block 139 openings. The optics shell 32 is then positioned over the sensor assembly 33 with its index pins 95 and 96 located in the indexing slots 135a and 136a in the sensor holder 42 and with its indexing pins 97 located in the indexing apertures 44c in the sensor printed circuit board 44. In addition, hooks 69 of the optics shell 32 are aligned with apertures 163 in the mounting bracket 34 and the optics shell is then pushed onto the mounting bracket 34 allowing the hooks 69 to pass through the apertures 163 and flex back securing the optics shell 32 and the sensor assembly 33 contained therewithin on the mounting bracket.

Referring to FIG. 16A, in this sub-assembly, the sensor assembly 33 is located with its open upper channel 41 facing the inner concave mirrored surface of the optics shell which defines the focusing mirrors 90. As can be seen, the curved sensor 41 extends in arcuate fashion along the concave curved inner surface of the optics shell 32, enabling the sensor element 41 to be located at the focal points of the four focusing mirror elements defined by the focusing mirror 90.

Referring again to FIG. 5, the lens 45 is positioned on the optics shell 32 with its locator holes 45a aligned with locator pins 68 which pass through the apertures 45a.

The mounting plate 34 with the circuit assembly 35 attached to its under surface 34a and the sensor assembly 33 and optics shell 32 secured to its upper surface 34b is then mounted on the housing 20 with the circuit assembly 35 extending into the open forward end thereof and hooks 20a of the housing 20 aligned with apertures 174 in the mounting bracket 34. The mounting bracket 34 is then pushed onto the housing allowing the hooks 20a to pass through the apertures 174 and snap into place securing the sensor module to the housing 20.

Referring now to FIGS. 1 and 2, the housing with the sensor module mounted thereon is positioned in a switch box (not shown) and secured thereto by screws which pass through the mounting slots 171a, 172a (FIG. 5) of the mounting bracket. The duplex wall switch plate 23 is then positioned over the front surface of the assembly and the front cover bezel 24, with the light lens assembly 29 mounted therein is positioned over the forward surface of the wall plate 23 and secured thereto and to the mounting plate 34 by screw 25 which is received in the threaded insert 165 in projection 164 (FIG. 5A) on the printed circuit board mounting bracket 52. As shown in FIGS. 1 and 2, the free end 153a of the mode switch 26 projects through the forward surface of the cover assembly as does the optics shell 32 enclosed within lens 45. As shown, the optics shell reflecting mirrors 70 and 80 project outwardly relative to the plane of the covers and so located to allow infrared radiation in a 180° arc around the forward and to the sides of the switch assembly to impinge directly on the reflective mirrors 70 and 80 for reflection onto the focusing mirror.

Operation of the Switch Assembly

The manner in which the switch assembly focuses infrared radiant energy present in its detecting fields onto the sensor 41 is described with reference to the simplified views of the switch assembly 15 with the radiation patterns illustrated in FIGS. 16 and 17.

Referring to FIG. 16, infrared radiation directed, toward the switch assembly 15 in a horizontal plane (±5°) at a height at about four feet, at the top thereof, represented by rays 331 and 332, directed toward the switch assembly 15 from the top of the horizontal field line is reflected by the planar mirror 70, as rays 331a and 332a, to the focusing mirror 90. The segment 91 of the focusing mirror 90 focuses the radiation as ray 331b onto the sensor 41 which is located at the focal point of segment 91 of the focusing mirror 90. Similarly, the segment 94 of the focusing mirror 90 focuses the radiation as ry 332b onto the sensor 41 which is located at the focal point of the mirror segment 94.

Similarly, infrared radiation directed generally horizontally towards the switch assembly from the bottom of the horizontal field, as ray 333, impinges on one of the mirror segments 80a and is reflected to focus mirror 92 as ray 333a. This radiation is focused on the sensor 41 as ray 333b.

Infrared radiation directed toward the switch assembly 15 at an angle of approximately 28° (±5°) from the horizontal is received in the "look-down" field, represented by ray 334. This radiation impinges on one of the segments 80b of mirror 80. The radiation is reflected upwards by the mirror segment 80b as ray 334a onto the segment 93 of the focusing mirror 90. The focusing mirror segment 93 focuses the radiation, as ray 334b, onto the sensor 41 which is located at the focal point of the focusing mirror segment 93.

Figure 17:
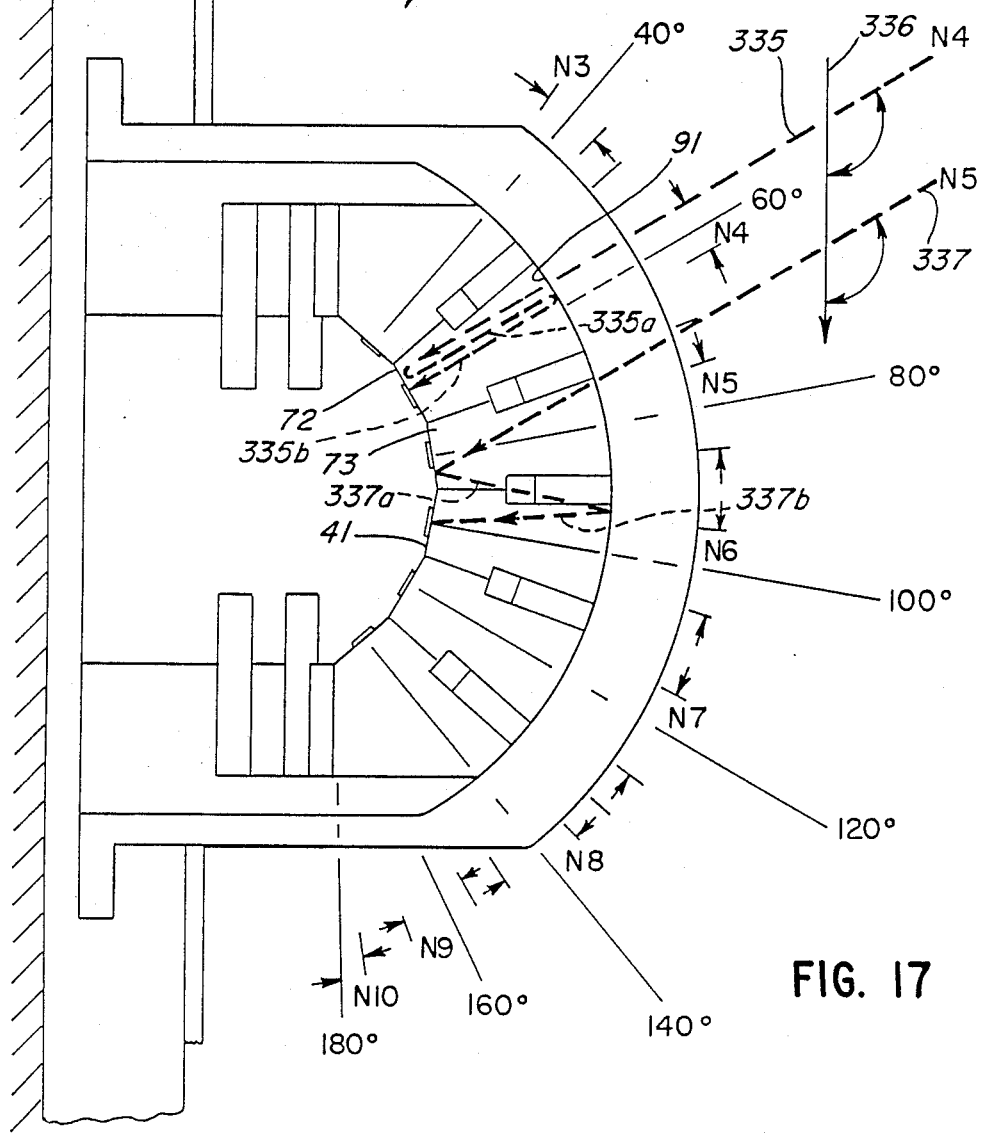
FIG. 17 is a simplified top view looking downward from the top of the switch assembly illustrating the sensor and the mirrors which direct rays onto the sensor.

With reference to FIG. 17, considering now the operation of the optical systems of the switch assembly 15 in receiving infrared radiation in the sensing fields N1–N10 as a source of radiation moves past the switch assembly in the direction of the arrow 336, for infrared radiation, represented by ray 335, in the sensing field N4 of the "look-out" field, for example, the radiation impinges on the planar mirror segment 72 which redirects the radiation as ray 335a onto the focusing mirror segment 91. The focusing mirror segment 91 focuses the radiation as ray 335b onto the sensor 41.

With continued movement in the direction of arrow 336, the source of infrared radiation moves into sensing field N5, radiating ray 337 to the switch assembly which impinges on mirror segment 73 and is reflected as ray 337a to the focusing mirror segment 91. The focusing mirror segment 91 focuses the radiation as ray 337b onto the sensor element 41.

For the case where the infrared radiation is originating in the "look-down" field and is in any of the sensing fields D1–D10, the operation is similar. However, the incoming radiation incoming at 28° (±5°) is directed by one of the reflective surfaces of mirror 80b to the focusing mirror FIG. 16.

Referring to FIGS. 4, 14 and 16, in all cases, the radiation is focused at the center line 41a of the sensor 41 to provide maximum signal output of the sensor 41. As the source of infrared radiation moves within range in the field N5 of the sensing field in the direction of arrow 337, the radiant infrared energy is initially focused at finger 106b of the sensor and sweeps along a generally straight line in the direction of the arrow 337 from finger 106b to finger 106f. Dead zones occur when the rays are focused between adjacent pairs of the fingers 106b–106f of the sensor electrodes.

When the focused energy reaches finger 106f, the direction reverses and with continued movement of the source of infrared radiation in the direction of arrow 338, the focused energy is directed to fingers 106e, 106d, etc.

When the source of radiation moves in the opposite direction, the focused energy is swept across the sensor in the reverse direction (arrow 338) from finger 106f to finger 106a. The size of the electrodes, which basically operate under a capacitive effect, defines the speed of response of the system to changes in movement within the sensing zones.

Circuit Operation

In operation, with reference to FIG. 18, it is assumed that the mode switch 26 is operated to the AUTO position. As is apparent, when the mode switch is operated "OFF", the ground connection to the light bulb 16 is open and the light bulb cannot be energized. In the "ON" position ground is connected directly to one side of the light bulb, turning on the light. In the absence of infrared radiation, the field effect transistor 203 is maintained on, providing a short circuit around capacitor 206, preventing the triac 59 from being turned on. Thus, very little AC current flows from the hot conductor W through the lamp 16. As long as capacitor 206 is short circuited by field effect transistor 203, triggering of the triac 59 is prevented and very little current flows through the lamp 16.

With reference to FIGS. 14, 17 and 18, when infrared radiation is directed to the sensor as the source of the infrared radiation moves relative to the sensing fields, the focus point of the radiation is swept along the sensor 41 from finger to finger of the electrode. As the focus point first approaches point F1, the signal output of electrode 109 increases relative to that of electrode 111 resulting in an increase in the signal at the non-inverting input of amplifier 187. The output signal of amplifier 187 responsively increases with continued movement of the source of radiation in the same direction, and approaches point F3. This results in a time varying signal which is coupled through capacitor 192 to the inverting input of amplifier 187a. Capacitor 193a and resistor 193 set the response time for amplifier 187a to the input signal to limit its response to signals varying at a rate greater than 60 Hz.

The positive half cycles of signal output of amplifier 187a are applied through diode 194 to the inverting input of comparator 195 and the negative half cycles of the signal are applied through diode 194a to the non-inverting input of comparator 195. When this signal is less than Va or greater than Vb (less the drop across diode 194 or 194a), respectively, the reference voltages at the non-inverting and inverting inputs of the comparator 195, the comparator provides a negative going output. Such output is coupled through resistor 196 to the non-inverting input of comparator 197, resulting in a negative going signal at the output of comparator 197. When this signal is applied to the inverting input of comparator 201, the output provides a positive going output. This signal turns off the field effect transistor 203, interrupting the shorting circuit path around the capacitor 206. Accordingly, the capacitor 206 can now charge during each cycle of the AC signal raising the potential at point 207 to above the breakover voltage of the breakover device 205, the triac 59 is triggered on energizing the lamp 16 with full power.

As long as the source of infrared radiation continues to move within the sensing field, the signal applied to the input stage 180 continues to vary, maintaining the drive stage enabled to keep the field effect transistor non-conducting. This enables the triac to be turned on each cycle to keep the lamp energized.

When variations in infrared radiation cease to be detected by the sensor, the input stage will inhibit the comparator stage 181 causing its output to become logic high level. However, the charge on capacitor 217 maintains the potential at the inverting input of the output stage comparator 220 at a potential higher than the non-inverting input. The output of comparator 220 is maintained at logic low level for the time duration, defined by the discharge time for capacitor 217, and inhibits all inputs to comparator stage 181. When the capacitor 217 discharges sufficiently, comparator 220 switches its output to logic high level, enabling comparator stage 181 to detect additional infrared changes.

The preceding operational description assumed that the photocell 28 was ineffective to inhibit circuit operation by virtue of the ambient light level being low enough to effect normal circuit operation or by virtue of the lens cover 28b being closed so as to prevent ambient light from being conducted to the photocell 28 via the light pipe 28a (FIG. 5A). For such conditions, the photocell, the resistance of which is proportional to applied light, maintains the dc voltage level at point 215 sufficiently low as to allow the signal output of comparator 220 to remain high to allow the above described operation of comparator stage 181.

When the lens cover 28b is open, and/or the ambient light level is high, the photocell will conduct, lowering its resistance. This causes the voltage level at point 215 to increase switching the output of comparator 220 low, inhibiting all outputs from comparator stage 181.

Second Embodiment of Switch Assembly

Referring to FIGS. 19–22, there is illustrated a second embodiment for a switch assembly 300 provided by the present invention. The switch assembly 300 is particularly suitable for automatic outdoor light control and is adapted for mounting on the exterior of a house or other building for controlling the turning on and off of a light, such as a porch light, yard light, or the like as someone approaches the dwelling or building.

Figure 22:
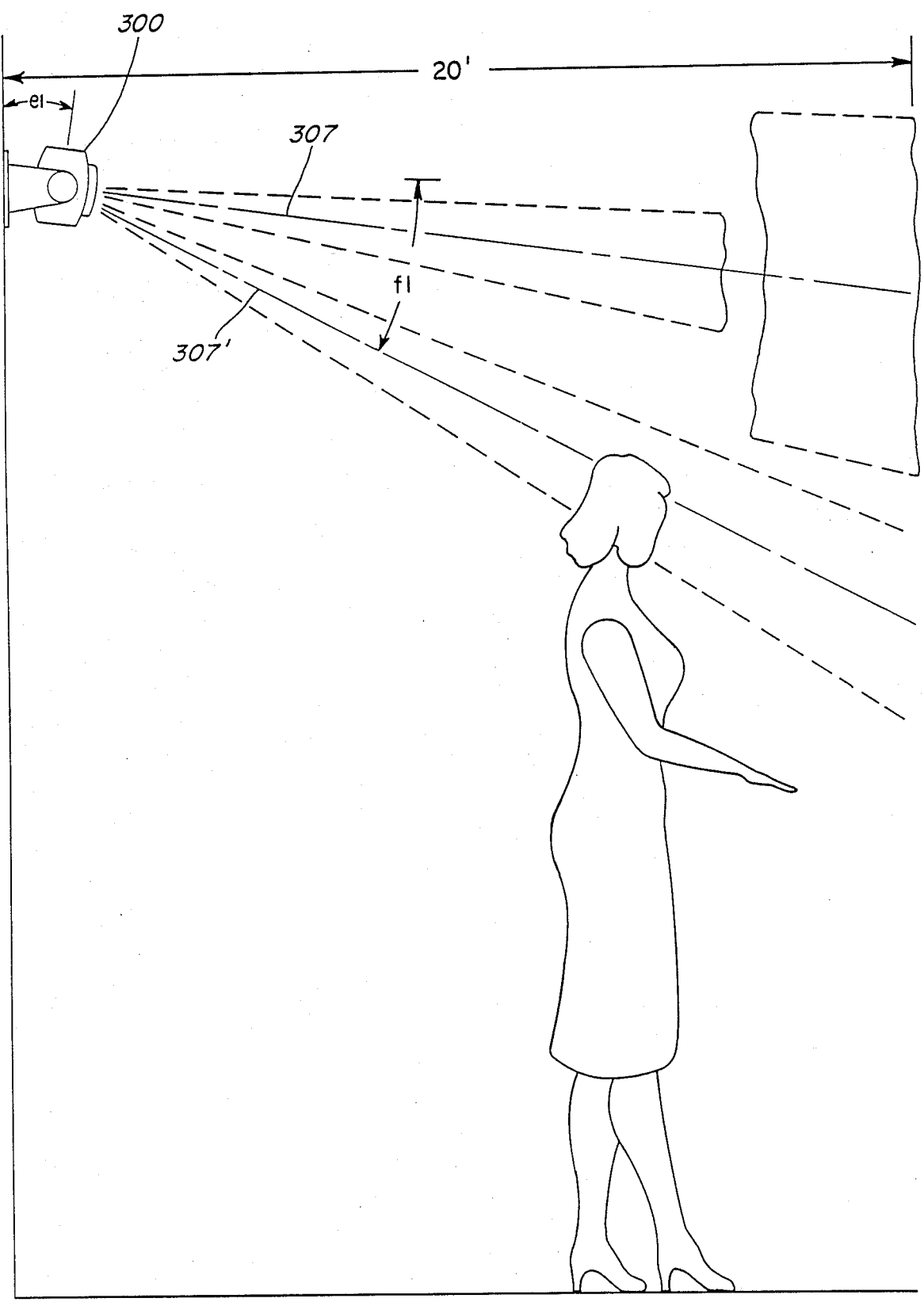
FIG. 22 illustrates the switch assembly mounted on a wall on the exterior of a building and illustrating the look-out field and look-down field for the switch assembly.

As shown in FIGS. 19–22 the sensor switch assembly 300 includes a housing 301 which contains a sensor assembly 302, and a mounting bracket 303 for pivotally mounting the housing on a vertical surface as illustrated in FIG. 22 which may be the exterior wall of a building or dwelling. In the embodiment shown in FIG. 22, the housing is pivoted forwardly and downwardly at an angle of approximately 8° off normal, the angle inclination being adjustable. As shown in FIG. 21, a screw 304 permits loosening of the housing relative to the mounting bracket for adjustment of the angle of inclination. The switch assembly 300 includes a photocell assembly 305 shown in FIG. 19 which enables the light to be kept off during daylight hours.

Figure 23:
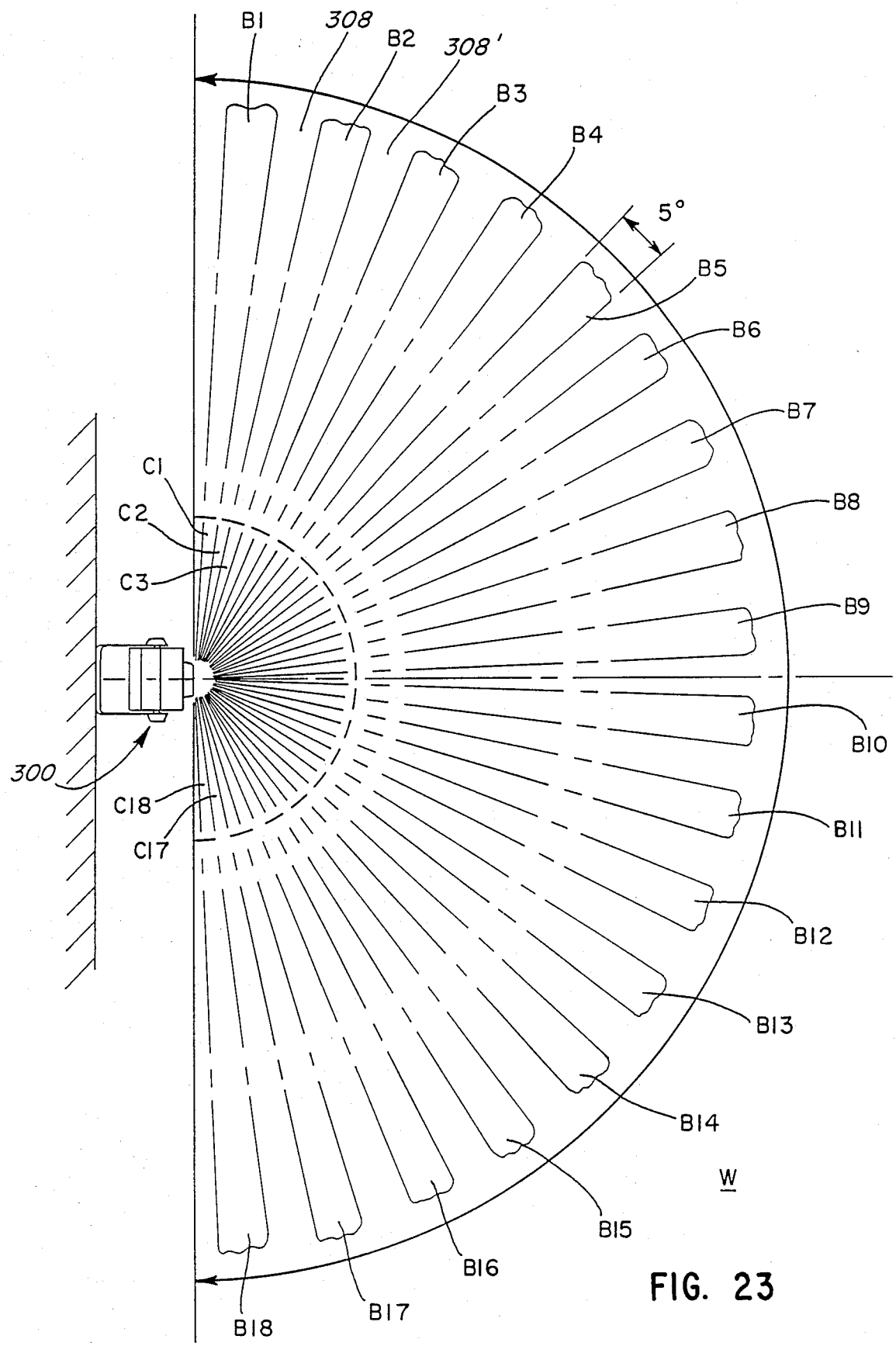
FIG. 23 is a downward plan view of the look-out field and the look-down field for the switch assembly.

In principal, the switch assembly 300 operates, similar to switch assembly 15, but because it is intended for mounting at a higher level, typically eight to ten feet above ground level, and to sense infrared radiation over larger field, the switch assembly 300 incorporates differences in its housing, optical system and sensor assembly as will become apparent. As will be shown, the switch assembly 300 defines two vertical fields of view including a shallow look-out field and a more vertical look-down zone shown in FIG. 22. Each of the look-out and look-down fields comprises eighteen zones each 10° in arcuate width providing a 180° field of view for the sensor in the look-out and look-down ranges as illustrated in FIG. 23.

The switch assembly 300 senses infrared radiation over a 180° range in horizontal planes. The sensing range includes two separate vertical fields of view, a shallow "look-out" field which extends downwardly at an angle e1 relative to the horizontal and a more vertical "look-down" field which extends downwardly at an angle f1 relative to the horizontal. In one switch assembly which was constructed, the angles e1 and f1 were 8° and 28°, respectively, providing semivertical angles of 82° and 62° for respective sensing fields. Each field in a vertical plane extends approximately 5° on either side of a center lines represented by the dashed 307,307' lines for the "look-out" field and the "look-down" field, respectively.

For the sensor used in an exemplary embodiment, the maximum sensing range for the switch assembly is on the order of 25 to 30 feet. When such a switch assembly is mounted at a height of eight feet, at the maximum limit of the sensing range, i.e. approximately twenty feet away from the place where the switch assembly is mounted, persons at least four feet tall will be detected. However, the maximum "look-down" field maximum range is approximately twelve feet at ground level from the location of the switch assembly for an angle e1 of 8°. Thus, any person not detected within the "look-out" field will be detected within the "look-down" field if the person approaches to within twelve feet of the building.

A person at least four feet tall entering the area encompassed by the twenty foot radius extending forward of the mounting location for the switch assembly 300 has to pass through the "look-out" field and would then cause the light bulb to be lit and remain lit for at least the duration of the delayed turn off period. Assuming that the person moves toward the location of the switch assembly, the person will pass out of the "look-out" field and pass through the "look-down" field, movements within either sensing field being detected by the switch assembly 300 to maintain the bulb lit.

For the "look-down" field, there is a circular dead zone having a radius of approximately three feet measured from a point directly beneath the switch assembly. In other words, a person standing in that zone who is less than five feet tall would not be detected. However, a person located directly beneath the switch assembly would move into the sensing range from time to time, and such movements would be sensed by the switch assembly, enabling the bulb to remain lit.

Referring to FIG. 23, the switch assembly 300 provides a 180° "look-out" field having eighteen sensing zones B1–B18, each 10° in arcuate length and a 180° "look-down" field having eighteen sensing zones C1–C18 of approximately 5° in angular extent. The 180° sensing fields are in the shape of a half cone at a predetermined semivertical angle which for the look-out field is 82° and for the look-down field is 62°. Each sensing zone has an angular width of approximately 10°, and is, for example, approximately 36" wide at a distance of about twenty feet radially outward from the switching assembly which is located at the mid-point. The longer the range, the greater the arc and the wider the field of view will be.

The eighteen sensing zones B1–B18 (and C1–C18), and the spaces between adjacent zones, such as space 308 between zones B1 and B2, space 308' between zones B2 and B3, etc., are determined by the configuration of the optical system and of the infrared sensor of the switch assembly as will be described.

Switch Assembly

Figure 24:
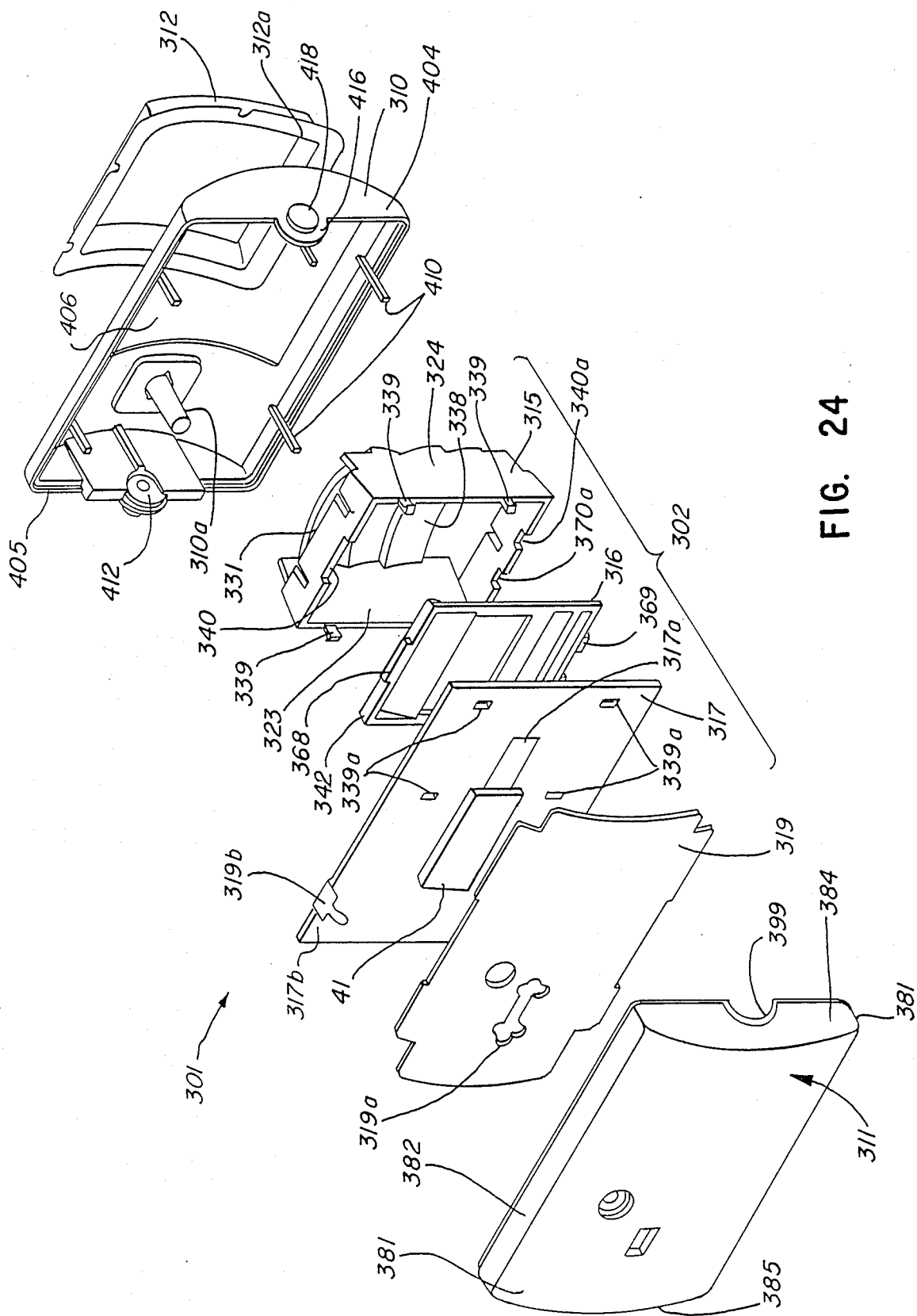
FIG. 24 is an exploded perspective view of the switch assembly shown in FIG. 19.

Referring to FIG. 24, which illustrates the sensor assembly 302 and the housing 301, the housing 301 comprises a housing front 310 and a housing rear 311, the housing front 310 including a lens 312 behind which is mounted the sensor assembly 301.

The sensor assembly 302 includes an optics shell 315 having an associated optics back plate 316, a printed circuit board 317, an infrared sensor 318 and an electrostatic shield 319.

Optics Shell

Referring to FIGS. 25-28, the optics shell 315 is a generally rectangular open ended box like structure which defines the focusing mirror for the switch assembly 300. The optics shell 315 has a top wall 321, a bottom wall 322 and side walls 323 and 324. The side walls 323 and 324 extend inwardly from the rearward edge toward the forward or front wall of the optics shell 315. The forward surface 325 of the optics shell 315 comprises an arcuate segment extending between the forward edges of the side walls 323 and 324, the forward portion terminating short of the upper wall 321 and terminating short of the lower wall 322 defining openings 331 and 332, respectively.

The inner rearward facing surface 326 of the forward wall defines a reflective surface of a stepped configuration including three reflecting segments 335, 336, and 337. The inner surfaces 338a of the side walls 323 and 324 also define reflective surfaces. The optics shell is a one-piece molded unit of a rigid material such as Cyclolac ABS. The inner surface 326 is coated with a reflective material, preferably aluminum, defining a focusing mirror comprising of segments 335-337 for the sensor assembly.

The concave arcuate reflecting segments 335 and 337 focus on the sensor infrared radiation present in the look-out field and directed toward the top and bottom of the switch assembly, and concave arcuate segment 336 focuses onto the sensor infrared radiation in the look-down field and directed toward the switch assembly. The reflecting segments 335-337 define the 10° vertical range for the sensing fields.

The optics shell 315 further comprises a plurality of hook members 339 extending outwardly and rearwardly from the side walls 323 and 324 for securing the optics shell 315 to the printed circuit board (FIG. 24) as will be shown. In addition, the upper and lower surface walls 321 and 322 define alignment slots 340 which are provided for indexing and aligning the optics shell 315 with the optics back plate 316.

The radii of the segments 335-337 in the horizontal plane vary with contour of the segments. The radius of curvature of segments 335 and 337 measured from a point 335R is 1.688 and the radius of curvature of segment 336 measured from a point 336R is 1.541. A segment 326a in the form of a planar element extends upwards and forwardly between the end of segment 337 and the lower end of segment 336 at an angle of 30° relative to the horizontal. The side walls 323 and 324 diverge from front to rear of the optics shell at an angle of 15°.

Optics Back Plate

Referring to FIGS. 29-34, the optics back plate 316 is a one-piece molded unit having a generally flat plate like portion with an outer frame 341 with top and bottom members 342 and 343, respectively, and side members 344 and 345. The back plate includes a first segmented planar mirror 350 which extends horizontally along the upper portion of the frame 345, defining twelve segments or facets 350A-350L. The segments 350A-350L are generally elongated rectangular elements of the same size and inclined forwardly from top to bottom at an angle of 15° relative to the vertical. As shown in FIG. 32, in the horizontal plane, the segments are oriented with their planar reflecting surfaces turned approximately 15° relative to a vertical plane extending through the forward surface of the mirror 50. Alternate segments 350A, 350C, 350E, etc., are oriented in one direction, such as to the left of the center line 351 of the optical assembly and the remaining elements 350B, 350D, etc. are oriented in the opposite direction to the right of the center line 351.

Similarly, a second segmented planar mirror 360 is formed integral with the frame 345 at the bottom portion thereof. The mirror 360 includes twelve segments or facets 360A-360L, having a lower reflective portion with segments 360A'-360L' corresponding to segments 350A-350L, inclined inwardly at an angle of 15° relative to the vertical and an upper portion with segments 360A"-360L" inclined at an angle of 5° relative to the vertical. Segments 360A-360L are oriented 15° relative to the vertical plane of the segmented mirror 360 in the manner of segments 350A-350L. The mirrors 350 and 360 correspond to mirrors 70 and 80 (FIG. 8) of the switch assembly 15 and function in much the same manner.

The twelve segments 350A-350L (and 360A'-360L') for the planar reflecting mirror 350 define the inner sensing zones B4-B15, the outer zones B1-B3 and B16-B18 are defined by a compound planar reflecting system including the reflective inner surfaces 338 of inner side walls of the optics shell (FIG. 28) and the outermost segments 350A, 50B (360A', 360B') and 350K, 350L (360K', 360L') for the look-out field. Similarly, reflective surfaces 338 and segments 360A", 360B" and 360K" and 360L" define sensing zones C1-C3 and C15-C18 for the look-down field. This enables the switch assembly 300 to provide a 180° range for the look-out and look-down sensing fields even though the optic assembly does not project beyond the forward surface of the housing in the assembled unit.

Figure 8:
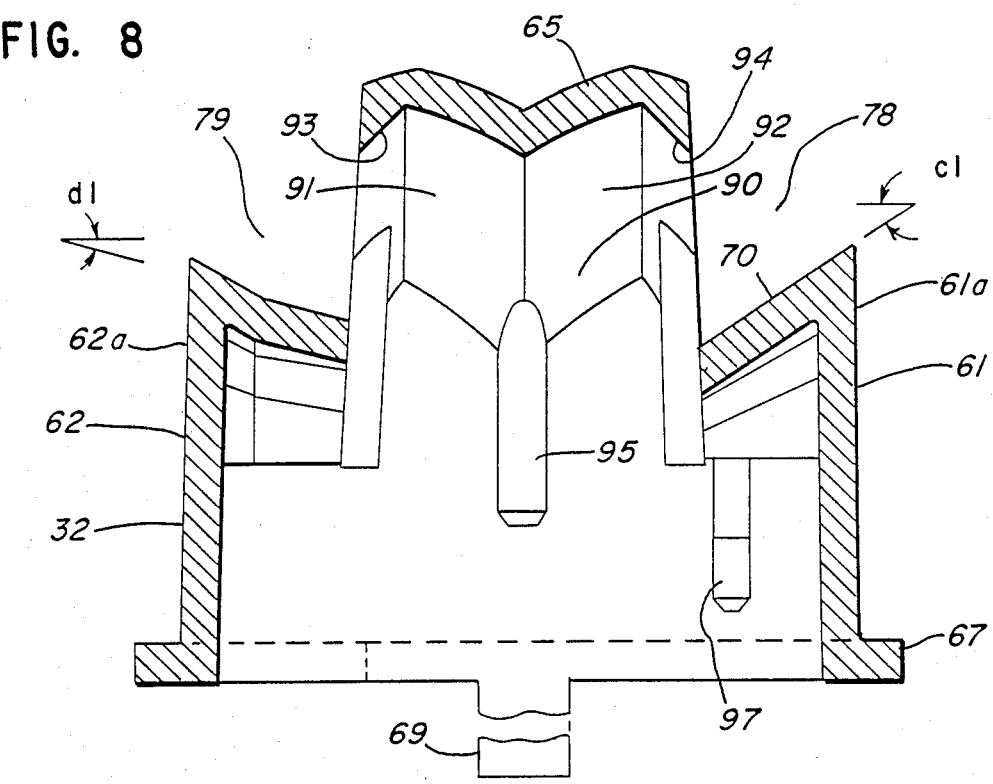
FIG. 8 is a vertical sectional view taken along the line 8—8 of FIG. 7.

The switch assembly 300 is intended for mounting high on a wall or other vertical surface, and may be located outside where it is subjected to the effects of weather. Thus, the optic assembly is contained within the housing and the optical shell assembly does not project through the forward surface of the housing. In addition, the reflecting mirrors 350 and 360 are not oriented in convex fashion as are the segments of mirrors 70 and 80 (FIG. 8).

The optics back plate 316 is made of Cycolac ABS, for example, coated with a suitable reflecting material, such as aluminum, applied, for example, by vacuum metalization, to form the segments of the mirrors 350 and 360.

An indexing tongue 368 projects upwardly from the top rail 342 and is received in the notch in the upper surface in the optics shell (FIG. 28). In addition, a pair of depending members 369 are received in the notches in the bottom side or lower side of the optics shell (FIG. 28).

The portion of the back plate 316 between the upper mirror 350 and lower mirror 360 is open defining a window 370 through which the sensor 41 is exposed to view.

Circuit Assembly

Figure 42:
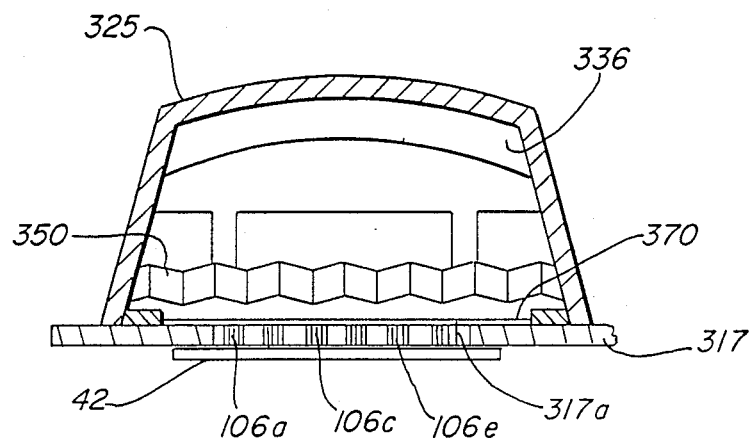
FIG. 42 is a sectional view of the optics shell assembly for the switch assembly shown in FIG. 29.

The control circuit for the switch assembly 300 is generally the same as for switch assembly 15 (FIG. 1) and thus will be described in detail. The control circuit is carried on the printed circuit board 317 which is constructed and arranged to mount the optic assembly of optics shell 315 on its forward surface and optics back plate 316. Referring to FIGS. 24 and 42, to this end, the printed circuit board 317 includes a rectangular aperture 317a.

The sensor 41 is secured to the rearward surface 317b overlying the aperture 317a and secured thereto in a suitable manner such as by use of a conductive adhesive. The optical assembly is mounted on the printed circuit board 317 overlying the aperture 317a such that the sensor 41 is located at the focal point of the focusing mirror.

Referring to FIG. 24, the static shield 319 is bowed rearwardly to conform to the curved surface of the housing back 311 and to provide clearance at its center for the under surface of the printed circuit board 317 and sensor 41 mounted thereon. A ground contact finger 319b on the printed circuit board extends rearwardly thereof to engage the static shield 319 in the assembled unit to connected ground for the control circuit to the static shield.

The control circuit for the switch assembly 300 includes a photocell (not shown) and light lens assembly 310a mounted in the housing front 310 to conduct ambient light to photocell in the manner described above for light lens assembly 29 (FIG. 1) for switch assembly 15. It is apparent that light lens assembly 310a may not include a lens cover for applications where the switch assembly 300 is used outdoors.

Switch assembly 300, may include a mode switch (not shown), adapted for mounting within the building with which the switch assembly is used.

Housing Rear

Figure 35:
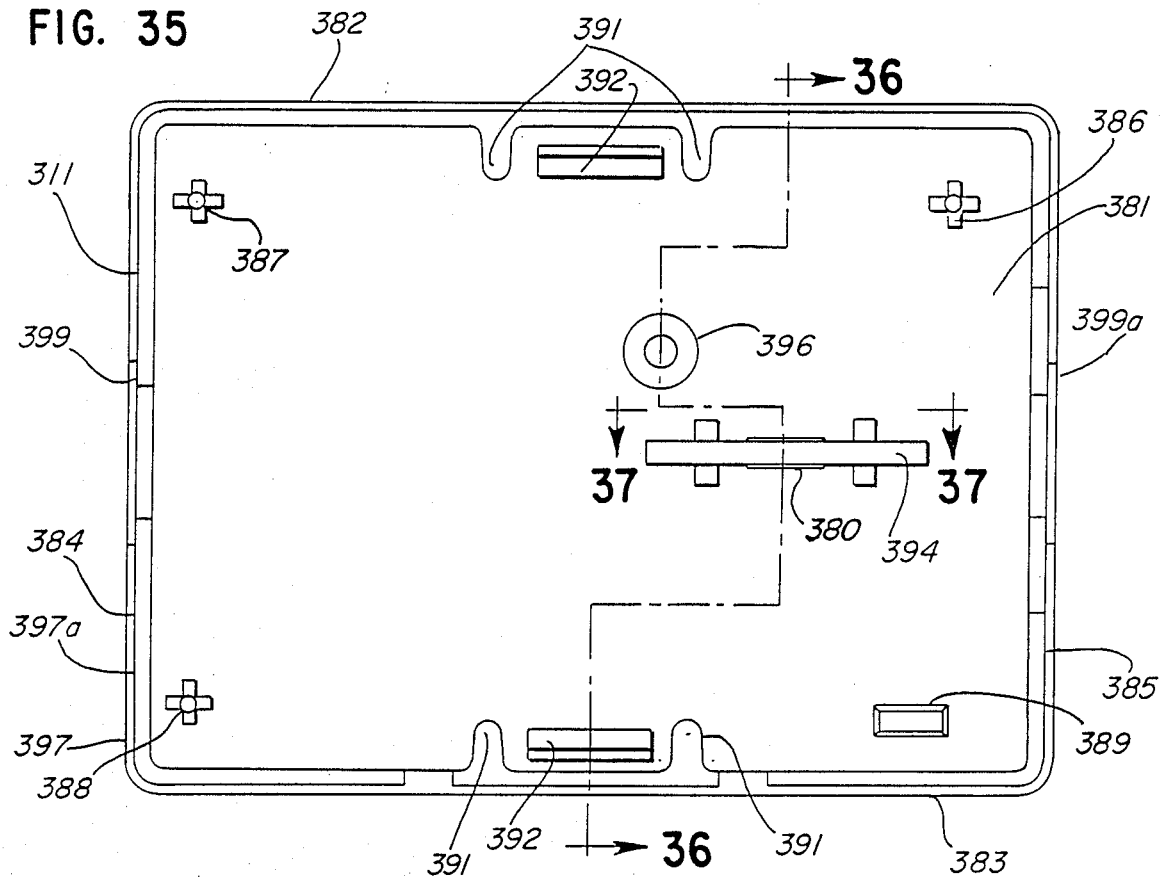
FIG. 35 is a front elevational view of a housing back for the switch assembly shown in FIG. 19.
Figure 36:
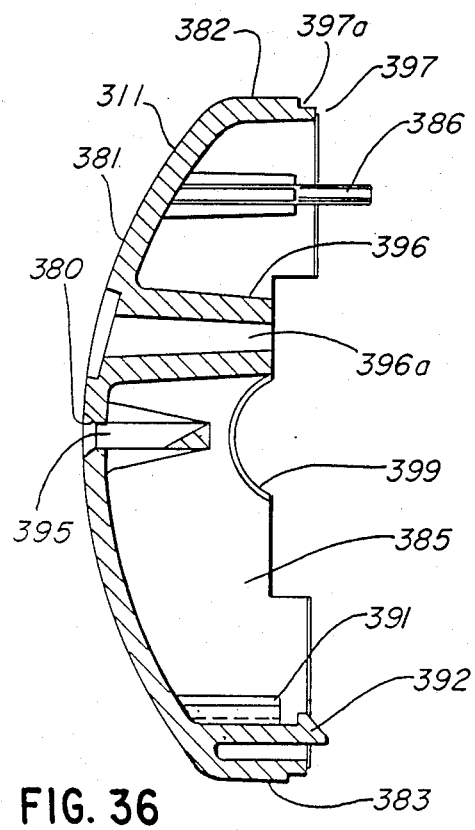
FIG. 36 is a vertical sectional view taken along the line 36—36 of FIG. 35.
Figure 37:
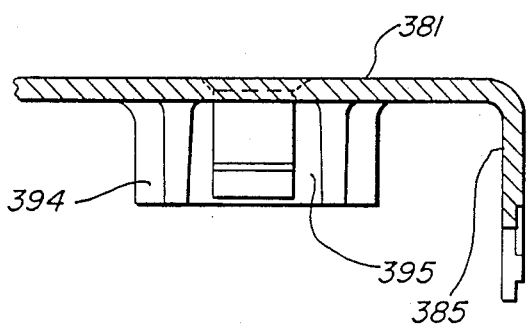
FIG. 37 is an enlarged fragmentary horizontal sectional view taken along the line 37—37 of FIG. 36.

Referring to FIGS. 35-37, the housing rear 311 is an elongated, dish-shaped member having a curved back surface 381, generally rectangular upper and lower surfaces 382 and 383 and side walls 384 and 385 projecting forwardly from the rear wall 381. A plurality of indexing members 386-389 project forwardly from the inner surface of the back wall 381 which serve as alignment and mounting pins for the printed circuit board 317 (FIG. 24). As shown in FIG. 36, the pins 386-388 project beyond the plane of the upper edge of the housing rear 311. A plurality of stop members 391 project forwardly from the rear wall near its upper and lower sides 382 and 383 serving as stops or supports for the underside 317b of the printed circuit board 317 (FIG. 24). A pair of catches 392 are defined between pairs of projections 391 at the upper and lower edges of the housing rear 311.

A generally rectangular shaped bridge member 394 projects forwardly from the rear wall 381 defining a connector locator for locating the electrical conductors which supply electrical power to the switch assembly. The bridge member 394 has a rectangular slot 395 through its bottom portion, shown best in FIGS. 36 and 37. The bridge member overlies a rectangular opening 380 formed through the rear wall 381 of the housing rear 311.

A generally cylindrical post 396 projects forwardly from the rear wall 381 and has a central bore 396a therethrough which extends through the surface 381 of the rear wall and is countersunk at 396a on the rear surface of the housing back as shown in FIG. 36. This opening permits insertion of an element for adjusting the turn off time delay for the control circuit of the switch assembly 300.

The catches 392 are resilient elements, enabling them to be flexed outwardly by the side edges of the printed circuit board which engage the tapered forward surfaces of the catches as the printed circuit board is pressed onto the housing rear 311 during assembly of the unit. The catches 392 can be flexed outwardly to release the printed circuit board for disassembly of the unit when necessary.

Referring to FIGS. 35 and 36, the side walls 384 and 385 define semi-circular cutouts 399 and 399a which mate with semi-circular projections 404a and 405a (FIG. 24) on end walls 404 and 405 of the housing front 310. The forward peripheral edge 397 of the housing rear 311 defines a ridge 397a. The housing rear 311 is preferably molded as a one-piece unit from a rigid material such as polystyrene.

Housing Front

Referring to FIGS. 38-41, the housing front 310 is generally semi-cylindrical in shape having a curved forward surface 401, generally rectangular top and bottom walls 402 and 403 and generally semi-circular end walls 404 and 405. The forward surface 401 has a rectangular cutout or aperture 406 in which is mounted the lens 312 (FIG. 24). The front surface 401 has a further recessed portion 407 having an aperture 408 therethrough which passes the light pipe 310a (FIG. 24) to communicate light forward of the switch assembly housing to the photocell (not shown) mounted on the printed circuit board 317 (FIG. 24).

Referring to FIGS. 39-41, a plurality of locating pins 410, which extend rearwardly from the housing front 310 near its peripheral edges, are located to be positioned for extending along the inner peripheral surface of the side walls of the housing rear 311. The peripheral edge 412 of the housing front 310 is cut back at its inner edge 414 for mating engagement with complementary peripheral edge 397 of the housing rear 311.

One end wall 404 of the housing front 310 defines a semi-circular projection 416 which acts as a pivot and has formed thereon and projecting outwardly therefrom a short cylindrical member 418 which mounts a cylindrical shaped bearing surface formed in side arm 303a in the mounting bracket 303 and defining a pivot surface for rotation of the housing relative to the bracket. The other end wall 405 of the housing front 310 has a reinforced section 418a including a semi-circular projection 420 having a brass eyelet 422 mounted therein for receiving the set screw 304 which provides the adjustable mounting for the housing relative to the mounting bracket 303. As shown in FIG. 41, a plurality of notches 424 are formed in the outer surface of the end wall 405 which are engaged by the inward projection or detent 426 on the mounting bracket 303 for locking it in place at the desired inclination. The housing front 310 is also made of polystyrene.

In assembling the switch assembly 300, with reference to FIG. 24, the optics back plate 316 is assembled together with the optics shell 315, aligning the projections 368 and 369 with the slots 340 and 340a, respectively. The optics assembly is then mounted on the printed circuit board 317, aligning the hooks 339 with the apertures 339a in the printed circuit board. The optics assembly is then pressed onto the printed circuit board causing its hooks 339 to flex inwardly, allowing them to pass through the apertures 339a and to then spring back when they have cleared the printed circuit board, engaging the rearward surface of the printed circuit board 317. This secures the optics assembly to the printed circuit board 317. As has been indicated, the sensor 41 is affixed to the rearward surface of the printed circuit board 317 by a conductive adhesive which connects the conductors of the element to conductors (not shown) of the printed circuit board 317.

The conductive shield 319 is positioned in the housing rear 311 with the connector inlet 394 passing through the aperture 319a. The assembled optic assembly and printed circuit board is then positioned in the housing rear 311 with the index apertures aligned with the indexing posts 386–388 and, with the unapertured corner of the printed circuit board 317 resting on the rectangular indexing post 389. The printed circuit board 317 is then pressed into the housing back 311 causing the catches 392 to engage the forward surface of the printed circuit board, pressing the printed circuit board against stops 391 and 391a at opposite side walls of the cover housing rear 311.

In assembling the housing front 310 on the housing rear 311, first the lens 312 is positioned on the housing front extending through the opening 406 with its flange 312a engaging the inner rearward surface of the housing front 310 around the periphery of the aperture 406. The housing front 310 is then aligned with the housing rear 311 with the index member 408 aligned with index notch 409 (FIG. 35) in the end wall of the housing rear 311. The housing front and back are secured together in a suitable manner, such as by ultrasonic welding along the junction between the edges of the housing front 310 and housing rear 311.

Referring to FIGS. 19–21, the thus assembled housing and sensor assembly is affixed to the mounting bracket 303 first inserting the annular bosses formed on the housing front 310 into respective recesses formed in the ends of the brackets. The housing is then adjusted to the desired angle, and the set screw 304 is tightened to bring the detent 426 into engagement with one of the notches 424 in the end wall of the housing, locking it in position.

Operation of the Switch Assembly

The manner in which the optical system of the switch assembly 300 focuses infrared radiant energy present in its detecting fields onto the sensor 41 is described with reference to the simplified views of the switch assembly 300 with the radiation patterns illustrated in FIGS. 43 and 44.

It is assumed that a source of infrared radiation is moving toward the location of the switch assembly 300, first entering the look-out field, and moves toward the switch assembly eventually passing into the look-down field and passing out of the look-out field.

Figure 43:
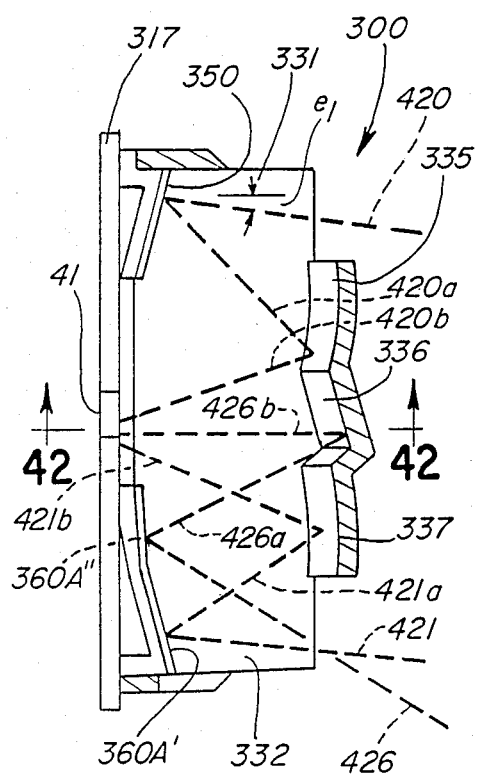
FIG. 43 is a simplified side sectional view of the switch assembly illustrating ray patterns.

Referring to FIGS. 22, 23 and 43, for the look-out sensing field, at or near the periphery of the 20 foot sensing field, infrared radiation, represented by rays 420 and 421, directed toward the switch assembly 300 at an angle of 8° ($\pm 5°$) off the horizontal is received in sensing zones B7 and B8 for example, of the look-out sensing field, and passes through the openings 331 and 332 in the upper and lower portions of the housing front 310. Ray 420 is reflected off mirror 350 at an angle of 46° onto segment 335 of the focusing mirror which as ray 420a which focuses the radiation a ray 420b onto the sensor. The ray 421 impinging on mirror 360 at an angle of 8° ($\pm 5°$) off the horizontal at the bottom of the housing is reflected as ray 421a to segment 337 of the focusing mirror. The focusing mirror segment 337 focuses the radiation as ray 421b onto the sensor.

In the near field range, say 10 feet away from the switch assembly, infrared radiation directed toward the switch assembly 300 at an angle of 28° ($\pm 5°$) will be detected in the look-down field. In the look-down field, such infrared radiation represented by ray 426 will impinge on one of the segments 360A (depending on location within the 180° field) of the reflecting mirror and be reflected at an angle of 23° ($\pm 5°$) as ray 426a onto focusing mirror segment 336. Focusing mirror segment 336 will focus the radiation as ray 426b onto the sensor.

Figure 44:
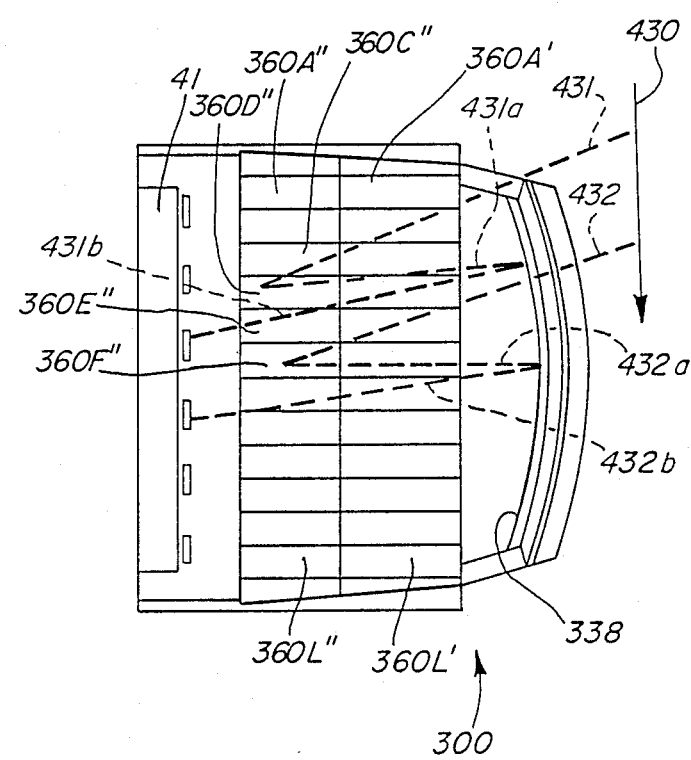
FIG. 44 is a simplified top view of the switch assembly illustrating ray patterns.

With reference to FIG. 44, the manner in which the optical system of the switch assembly 300 receives infrared radiation in a generally horizontal field due to a person passing parallel to or in front of the switch assembly 300 in the near field range, is similar to that just described. However, the planar reflecting segments 360A–360L define two generally planar reflecting mirrors, one facing towards the left and the other towards the right of the center line of the unit. Thus, for a person passing the switch assembly 300 from the left of center in the direction of arrow 430 in FIG. 44, the radiation will impinge on segments 360B, 360D, 360F, etc., whereas for a person moving to the right of center, the radiation will impinge on segments 360A, 360C, 360E, etc.

Thus, assuming that a person is moving parallel to the switch assembly 300 in direction of arrow 430 to the left of center, entering at zone C5, for example, and passing through zones C6 and C7 in succession, as the person moves into the sensing field, infrared radiation represented by ray 431 will impinge on segment 360D and will be reflected to the focusing mirror segment 336. Focusing mirror segment 336 focuses the radiation as ray 431b onto the sensor 41. With continued movement of the person, infrared radiation represented as ray 432 will impinge on segment 360F" and be reflected as ray 432a to focusing mirror segment 336. The focusing mirror segment 336 will focus the radiation as ray 432b onto the sensor 41.

The operation is similar for infrared radiation in the look-out field, the radiation being reflected by the segment 360.

As described previously with reference to switch assembly 15, in all cases, the radiation is focused at the center of the sensor 41 to provide maximum signal output of the sensor. As a source of infrared radiation moves from sensing zone to sensing zone, the infrared energy is swept along a generally straight line along the sensor from finger to finger.

We claim:

1. An infrared radiation actuated control switch assembly responsive to infrared radiation within a given space for controlling a functional device in response to variations in infrared radiation, indicative of movement of a source of infrared radiation within the space, comprising sensing means including a sensing element responsive to infrared radiation; optical means; control circuit means; and housing means for containing said sensing means, said optical means and said control circuit means;

said housing means being constructed and arranged for mounting within the space;

said optical means being supported within said housing means and including first planar reflecting means, second planar reflecting means and focusing means, said sensing element being mounted in an operative relation with said focusing means, said first planar reflecting means including a first plurality of planar reflecting segments arranged in juxtaposed relation and inclined at a first vertical angle defining a first reflecting surface for reflecting to said focusing means infrared radiation in a first sensing field extending at a first predetermined semivertical angle within the space, said second planar reflecting means including a second plurality of planar reflecting segments arranged in juxtaposed relation and inclined at a second vertical angle defining a second reflecting surface for reflecting to said focusing means infrared radiation in a second sensing field extending at a second predetermined semivertical angle within the space, and said focusing means having first and second curved reflecting surfaces for focusing onto said sensing element infrared radiation from said first and second sensing fields, respectively, reflected thereto by said first and second planar reflecting means, said circuit means being connected to said sensing element and responsive to said sensing element for providing an output for energizing the functional device in response to variation in infrared radiation focused onto said sensing element, indicative of movement of source of infrared radiation within the space.

2. A control switch assembly according to claim 1, wherein the functional device is an illuminating device, said housing means including connection means adapted to connect said control circuit means to a source of power for said illuminating device.

3. A control switch assembly according to claim 1, including means for mounting said housing means on a wall of a building, said planar reflecting segments of said first reflecting means being positioned to direct infrared radiation to said first curved reflecting surface of said focusing means from a first shallow vertical sensing field generally semiconical in shape and extending over a 180° range, and said planar reflecting segments of said second reflecting means being positioned to direct infrared radiation to said second curved reflecting surface of said focusing means from a more vertical look-down sensing field generally semiconical in shape and extending over a range of 180°.

4. A control switch assembly according to claim 1, wherein said housing means is constructed and arranged for mounting in a wall mounted electrical switch box.

5. A control switch assembly according to claim 1, wherein said first semivertical angle is 90° and said second semivertical angle is in the range of about 25° to 35°.

6. A control switch assembly according to claim 1, wherein said first semivertical angle is in the range of about 75° to 85° and said second vertical angle is in the range of about 55° to 65°.

7. A control switch assembly according to claim 1, wherein said housing means encloses said sensing means, said optical means and said circuit means therewithin and includes means defining an optical window of an infrared pervious material for passing infrared radiation into said housing means, said optical means being supported within said housing means rearward of said optical window.

8. A control switch assembly according to claim 1, wherein said first plurality of planar segments and said second plurality of planar segments define respective first and second convex reflecting surfaces for directing infrared radiation from said first and second fields to said focusing mirror.

9. A control switch assembly according to claim 1, wherein said focusing means comprises first and second arcuate concave mirrors for focusing infrared radiation to said sensing element infrared radiation reflected thereto by said first and second planar reflecting means, respectively.

10. A control switch assembly according to claim 1, wherein said sensing element is constructed and arranged to define a plurality of infrared radiation sensing areas thereon whereby each of the sensing fields is subdivided into a plurality of sensing zones.

11. A control switch assembly according to claim 1, wherein said control circuit means is selectively operable in a manual mode in which operation of the functional device is controlled by a user and an automatic mode in which the operation of the functional device is controlled by the control circuit in response to variations in infrared radiation sensed by the control switch, and mode switch means for selecting the operating mode for the control switch assembly.

12. A control switch assembly according to claim 1, wherein said control circuit means includes light sensing means responsive to ambient light in excess of a preselected level to inhibit operation of said control circuit means.

13. A control switch assembly according to claim 12, wherein said light sensing means includes a photosensor mounted within said housing means and light lens means mounted in said housing means for conducting ambient light into said housing to said photosensor and lens cover means movable to overlie said light lens means to limit entry of ambient light into said housing means.

14. An infrared radiation actuated control switch assembly responsive to infrared radiation within a given space for controlling a functional device in response to variations in infrared radiation, indicative of movement of a source of infrared radiation within the space, comprising sensing means including a sensing element responsive to infrared radiation; optical means; control circuit means; and housing means for containing said sensing means, said optical means and said control circuit means;

said housing means being constructed and arranged for mounting within the space;

said optical means including a hollow shell supported within said housing means and including a first inner surface facing rearwardly of said shell and having a plurality of concave reflecting surface portions defining at least first and second focusing mirrors, and means defining first planar reflecting means and second planar reflecting means within said shell rearwardly of and facing said concave reflecting surface portions, said sensing element being mounted in an operative relation with said focusing mirrors, said first planar reflecting means including a first plurality of planar reflecting segments arranged in juxtaposed relation and inclined at a first vertical angle defining a first reflecting surface for reflecting to said first focusing mirror infrared radiation in a first sensing field extending at a first predetermined semivertical angle within the space, a said second planar reflecting means including a second plurality of planar reflecting segments arranged in juxtaposed relation and inclined at a second vertical angle defining a second reflecting surface for reflecting to said second focusing mirror infrared radiation in a second sensing field extending at a second predetermined semivertical angle within the space, and said first and second focusing means mirrors focusing onto said sensing element infrared radiation from said first and second sensing fields, respectively, reflected thereto by said first and second planar reflecting means, said circuit means being connected to said sensing element and responsive to said sensing element for providing an output for energizing the functional device in response to variation in infrared radiation focused onto said sensing element, indicative of movement of source of infrared radiation within the space.

15. A control switch assembly according to claim 14, wherein said first reflective surface shell has a curved, inwardly facing portion stepped in the vertical direction defining first and second concave arcuate bands of reflective material which are inclined at different angles relative to the vertical axis of said shell.

16. A control switch assembly according to claim 15, wherein said sensing element is a convex curved member, the radius of curvature of said sensing element corresponding generally to the radius of curvature of said inwardly facing surface of said shell member and said sensing element located within said shell member adjacent to said inwardly facing surface of said shell member.

17. A control switch assembly according to claim 14, wherein said second reflective surface of said shell defines said first planar reflecting segments in an upper portion thereof and said second planar reflecting segments in a lower portion thereof, and wherein said first planar reflecting segment inclined from top to bottom rearwardly of said shell at said vertical angle and said second planar reflecting segments inclined from top to bottom forwardly of said shell.

18. A control switch assembly according to claim 14, wherein said first plurality of planar reflecting segments extend in end to end relation with corresponding ones of said second planar reflecting segments and have their reflective surfaces inclined at a vertical angle greater than the vertical angle at which said second planar reflecting segments are inclined.

19. A control switch assembly according to claim 14, wherein said shell is a one-piece unit having a hollow body portion generally ellipsoidal in shape with first and second inner opposing arcuate surfaces defining said focusing means and said reflecting segments, respectively, said focusing means extending parallel to the longitudinal axis of said body portion, said first and second planar surfaces facing said focusing means, for reflecting onto said focusing means infrared radiation from associated sensing fields.

20. A control switch assembly according to claim 14, wherein said shell has forward and rearward walls, said rearward wall having said planar reflecting means on a generally vertical inner surface thereof and said forward wall having said focusing means on a generally vertically extending rearward facing surface thereof and opposing said inner surface of said rearward wall.

21. A control switch assembly according to claim 20, wherein said planar reflecting means comprises a plurality of elongated planar segments extending at an angle relative to the vertical axis of said optical means with a first group of said segments facing toward the left of the forward extending horizontal axis of said optical means and a second group of said segments facing toward the right of the forward extending horizontal axis.

22. An infrared radiation actuated control switch assembly responsive to infrared radiation within a space for controlling a functional device in response to variation in infrared radiation indicative of movement of a source of infrared radiation within the space, comprising infrared radiation sensing means; optical means; control circuit means; and housing means for containing said sensing means, said optical means and said control circuit means;

said housing means being constructed and arranged for mounting within the space;

said optical means including an optics shell means supported within said housing and including a hollow body portion including a first inner surface having a plurality of concave reflective surface portions defining at least first and second concave focusing mirrors, and means defining first and second planar reflecting means within said hollow body portion facing said concave reflective surface portions, said first planar reflecting means having a first plurality of planar reflecting segments facing said first focusing mirror, and extending at a predetermined angle relative to said inner surface to reflect onto said first focusing mirror infrared radiation from a first sensing field at a first semivertical angle within the space, and said second planar reflecting means having a second plurality of planar reflecting segments facing said second focusing mirror, and extending at a second predetermined angle relative to said inner surface to reflect onto said second focusing mirror infrared radiation from a second sensing field at a second semivertical angle within the space, said first and second focusing mirrors focusing onto said sensing means infrared radiation from said first and second sensing fields reflected thereto by said first and second planar reflecting means; and said circuit means being connected to said sensing means and responsive to said sensing means for providing an output for energizing the functional device in response to variation in infrared radiation focused onto said sensing means indicative of movement of a source of infrared radiation within the space.

23. A control switch assembly according to claim 22, wherein said optics shell means comprises a hollow one-piece shell member with said first and second focusing mirrors formed on an inner surface of a forward wall thereof and said first plurality of planar reflective segments formed on a first inwardly projecting portion of said shell member, and said second plurality of planar reflective segments formed on a second inwardly projecting portion of said shell member.

24. A control switch assembly according to claim 22, wherein said optics shell means comprises a forward wall and a rearward wall having said first and second focusing mirrors formed on an inner surface of said forward wall and having said first and second planar reflective segments formed on an inner surface of said rearward wall.

25. A control switch assembly according to claim 23, wherein said sensing means comprises a sensing element and a holder having a recessed inner surface receiving said sensing element, said shell member having first indexing means at its lower edge located near the ends thereof, said holder being located within said shell member and having second indexing means complementary to said first indexing means of said shell member for locating said sensing element adjacent to said focusing mirrors.

26. A control switch assembly according to claim 25, wherein said holder has a central aperture, rectangular in shape, in its inner surface, said sensing element being supported by its edges in overlying relationship with the aperture, and said holder having an arcuate forward surface having a radius of curvature corresponding to the radius of curvature of said shell member inner surface locating reflective surfaces of said focusing mirrors in close proximity to the upper surface of said sensing element.

27. A control switch assembly according to claim 22, wherein said housing means comprises a housing front and a housing rear portion, said housing front defining an optic window, said housing rear portion having an annular wall portion provided with an outer peripheral groove defining a mounting channel, said housing rear portion further defining mounting means for receiving said optics shell inwardly of said optical window and locating same relative to the optical window with its reflective surfaces located behind said optical window, and said housing front portion having a generally annular shaped edge provided with a peripheral channel for receiving the edge of said housing rear portion and locking means including a plurality of indexing members extending rearwardly from said housing front and means cooperating with said indexing member to index said housing front portion to said housing rear portion with the optical shell means behind said optical window.

28. A control switch assembly according to claim 22, wherein the functional device is an illuminating device and wherein said housing means is constructed and arranged for mounting in a wall switch box in which are terminated a pair of electrical power conductors, and including contact means providing an electrical connection between said electrical power conductors and terminals of said circuit means; said housing means including a mounting plate constructed and arranged for mounting to the wall switch box, and a cover plate enclosing an open forward end of said housing means.

29. A control switch assembly according to claim 22, wherein the functional device is an illuminating device located for illuminating an area outside of a building, and including means for mounting said housing means on an exterior wall of the building.

30. An infrared radiation actuated control switch assembly responsive to infrared radiation within a space for controlling a functional device in response to variation in infrared radiation indicative of movement of a source of infrared radiation within the space, comprising infrared radiation sensing means; optical means; control circuit means; and a housing for containing said sensing means, said optical means and said control circuit means;

said housing being constructed and arranged for mounting within the space;

said optical means including an optics shell supported within said housing and including a hollow body portion having a forward wall, first and second side walls, and top and bottom walls, said forward wall having an arcuate inner surface with concave reflective portions defining at least first and second focusing mirrors, said top and bottom walls having respective first and second generally convex reflective surfaces located rearwardly and facing said forward wall, said first reflective surface having a first plurality of planar reflective segments facing said first focusing mirrors and positioned to reflect onto said focusing mirror infrared radiation in a first sensing field within the space, and said second reflecting means having a second plurality of planar reflective surfaces facing said second focusing mirror for reflecting onto said focusing mirror infrared radiation from a second sensing field, respectively, within the space, said focusing mirrors focusing the radiation onto said sensing element;

said circuit means being connected to said sensing means and responsive to said sensing means for providing an output for energizing the functional device in response to variation in infrared radiation focused onto said sensing means indicative of movement of a source of infrared radiation within the space.

31. An infrared radiation actuated control switch assembly responsive to infrared radiation within a space for controlling a functional device in response to variation in infrared radiation indicative of movement of a source of infrared radiation within the space, comprising infrared radiation sensing means; optical means; control circuit means; and a housing for containing said sensing means, said optical means and said control circuit means;

said housing being constructed and arranged for mounting within the space;

said optical means including an optics shell means supported within said housing and including a hollow body portion having forward and rearward walls, first and second side walls, and top and bottom walls, said forward wall having concave reflective surface portions defining first and second focusing mirrors, said rearward wall having first and second reflective surface portions near the top and bottom ends thereof respectively, said first reflective surface portion including a first plurality of segments each having a planar reflective surface facing said first focusing mirror and positioned to reflect onto said first focusing mirror infrared radiation from a first sensing field within the space, said second reflective surface portion including a second plurality of segments each having a planar reflecting surface facing said second focusing mirror for reflecting onto said second focusing mirror infrared radiation from a second sensing field within said space, said first and second focusing mirrors focusing the radiation onto said sensing element;

said circuit means being connected to said sensing means and responsive to said sensing means for providing an output for energizing the functional device in response to variation in infrared radiation focused onto said sensing means indicative of movement of a source of infrared radiation within the space.

32. A control switch assembly according to claim 31, wherein said second reflective surface portion includes a third plurality of segments each having a planar reflecting surface facing said first focusing mirror for focusing onto said first focusing mirror infrared radiation from the first sensing field.

* * * * *